United States Patent
Saito et al.

(10) Patent No.: US 8,014,827 B2
(45) Date of Patent: Sep. 6, 2011

(54) BASE STATION WHICH COMMUNICATES ACCORDING TO A RETRANSMISSION CONTROL

(75) Inventors: Toshiyuki Saito, Kokubunji (JP); Seishi Hanaoka, Tokyo (JP); Takashi Yano, Tokorozawa (JP); Satoshi Tamaki, Kokubunji (JP); Mikio Kuwahara, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1067 days.

(21) Appl. No.: 11/794,125

(22) PCT Filed: Dec. 28, 2004

(86) PCT No.: PCT/JP2004/019841
§ 371 (c)(1),
(2), (4) Date: Jun. 26, 2007

(87) PCT Pub. No.: WO2006/070484
PCT Pub. Date: Jul. 6, 2006

(65) Prior Publication Data
US 2008/0008135 A1      Jan. 10, 2008

(51) Int. Cl.
H04B 7/02       (2006.01)
H04B 7/005      (2006.01)
H04L 1/02       (2006.01)
H04L 27/00      (2006.01)
H04L 12/26      (2006.01)
H04L 27/28      (2006.01)
G06F 15/16      (2006.01)
H04J 1/00       (2006.01)
H04W 72/00      (2009.01)
H04W 72/04      (2009.01)

(52) U.S. Cl. ........ 455/561; 455/436; 455/450; 455/501; 455/509; 455/522; 370/208; 370/252; 370/328; 370/329; 370/335; 375/259; 375/260; 375/267; 714/748; 714/749

(58) Field of Classification Search .................. 455/450, 455/509, 436, 501, 522, 561; 370/328, 329, 370/350, 208, 252, 335; 719/748, 749; 714/748, 714/749; 375/259, 260, 267
See application file for complete search history.

(56) References Cited

U.S. PATENT DOCUMENTS
2001/0024427 A1      9/2001 Suzuki
(Continued)

FOREIGN PATENT DOCUMENTS
CN        1422032 A       6/2003
(Continued)

OTHER PUBLICATIONS

Jalali, A. et al. "Data Throughput of CDMA-HDR a High Efficiency-High Data Rate Personal Communication Wireless System", IEEE VTC 2000, pp. 1854-1858.

(Continued)

*Primary Examiner* — William D Cumming
(74) *Attorney, Agent, or Firm* — Stites & Harbison, PLLC; Juan Carlos A. Marquez, Esq.

(57) ABSTRACT

There are provided scheduling and a resend control system, which match simultaneous communications using a plurality of carriers. For individual carriers to be used, the simultaneous resend control of the carriers is made by notifying channel information and a data decoding result and by managing the resend numbers. Even in case the communications are performed by using the carriers simultaneously between a base station and a terminal, the scheduling can be done to contain the resend control. It is also possible to improve the communication quality and the throughput.

14 Claims, 22 Drawing Sheets

U.S. PATENT DOCUMENTS

| | | | |
|---|---|---|---|
| 2006/0062140 A1 | 3/2006 | Sudo | |
| 2010/0220652 A1* | 9/2010 | Ishii et al. | 370/328 |
| 2010/0220711 A1* | 9/2010 | Ishii | 370/350 |
| 2010/0232356 A1* | 9/2010 | Maheshwari et al. | 370/328 |
| 2010/0234035 A1* | 9/2010 | Fujishima et al. | 455/450 |
| 2010/0235705 A1* | 9/2010 | Kim et al. | 714/749 |
| 2010/0238886 A1* | 9/2010 | Sambhwani et al. | 370/329 |
| 2010/0248765 A1* | 9/2010 | Chun et al. | 455/509 |
| 2010/0251054 A1* | 9/2010 | Cai et al. | 714/748 |

FOREIGN PATENT DOCUMENTS

| | | |
|---|---|---|
| JP | 11-252056 | 3/1998 |
| JP | 2001-238269 | 2/2000 |
| JP | 2004-104293 | 9/2002 |
| JP | 2004-147068 | 10/2002 |
| JP | 2004-187226 | 12/2002 |
| JP | 2004-248005 | 2/2003 |
| JP | 2004-266739 | 3/2003 |
| JP | 2004-274220 | 3/2003 |
| JP | 2004-304268 | 3/2003 |
| JP | 2004-248005 | 9/2004 |
| WO | WO 02/19605 A2 | 3/2002 |
| WO | WO 2004/088853 A1 | 3/2004 |

OTHER PUBLICATIONS

Office Action from Chinese Patent Office for Application 200480044769.8 mailed Dec. 11, 2009.

"cdma2000 High Rate Packet Data Air Interface Specification", $3^{rd}$ Generation Partnership Project 2 "3GPP2", 3GPP2 C.S0024, Version 4.0, Oct. 25, 2002, title page, pp. 1-12, 9-62-9-67.

R. Novak, et al., "Efficient Packet Data Service in a Spread Spectrum OFDM Cellular System with 2-Dimensional Radio Resource Allocation", European Transactions on Telecommunications, Wiley & Sons, Chichester, GB, vol. 15, No. 3, May 1, 2004, pp. 185-199, XP001199003, ISSN: 1124-318X, DOI: DOI:10.1002/ETT.965.

European Patent Office Communication with a Supplementary European Search Report dated Dec. 27, 2010, issued in Application No. EP 04816698.7-1237 / 1833182 (4 pages).

Office Action from Japanese Patent Office in the corresponding Japanese Patent Application No. 2006-550549, dated Oct. 19, 2010, with Concise Explanation in English.

Decision of Refusal dispatched on Apr. 12, 2011 by the Japanese Patent Office in the corresponding Japanese Patent Application No. 2006-550549 (2 pages) along with an English language Concise Explanation (1 page).

* cited by examiner

WHEN HARQ IS UNTERMINATED, DATA BEING TRANSMITTED (ALREADY SELECTED) IS ALSO TARGETED FOR SCHEDULING

BASE STATION WHICH COMMUNICATES ACCORDING TO A RETRANSMISSION CONTROL

TECHNICAL FIELD

This invention relates to a retransmission control method for a multicarrier wireless communication system. In particular, this invention is preferably applicable to a mobile communication system.

BACKGROUND OF THE INVENTION

FIG. 1 shows a configuration of a general cellular communication system. A plurality of terminals (mobile stations) 103, 104, 105, and 106 make wireless communication with base stations 101 and 102. The base stations 101 and 102 establish communication among the terminals or communication with communication equipment belonging to a fixed network 108, under control of a base-station control station 107. When communication with the communication equipment belonging to the fixed network 108 is established, a part of all the belonging terminals is selected.

There is known means for preferentially selecting a terminal with a higher communicable transmission rate from among the belonging terminals in order to improve throughput of a base station (scheduling), in such a wireless communication system. For example, "Data throughput of CDMA-HDR a high efficiency-high data personal communication wireless system" by A. Jalali, R. Padovani, and R. Pankaj, IEEE VTC-Spring 2000, Tokyo, Japan, May 2000 (Non-patent Document 1) discloses a technique involving causing each of belonging terminals to measure a channel condition and notify it as a maximum receivable transmission rate and determining a terminal with the highest rate of the maximum receivable transmission rate to an average rate as a transmission target, thereby improving the throughput of the base station while fairness among the terminals is secured.

As a method of obtaining a time diversity effect, there is known an HARQ (Hybrid ARQ) method in which retransmission control by an ARQ (Automatic Repeat reQuest) method is performed, and decoding is further performed with the same packet that has already received.

By combining those methods, it is possible to communicate with each terminal with a quality corresponding to the condition of the terminal while securing fairness among the terminals. For example, 3GPP2 C.S0024 Version 4.0 "cdma 2000 High Rate Packet Data Air Interface Specification" pp. 9-62 to 9-67 (Non-patent Document 2) discloses a technique in which the maximum number of retransmissions is set for each transmission rate to perform HARQ communication, and scheduling is performed when the retransmission ends (when the maximum number of transmissions has been reached or when notification of completion of decoding is received from the terminal side).

FIG. 2 shows a control sequence of a conventional technique. First, a base station transmits a time-multiplexed signal of transmission data and a pilot signal to a terminal to be a transmission target (201). The terminal calculates an SIR (a signal-to-interference power ratio) from the pilot signal (202) and transmits a DRC (information about the maximum receivable transmission rate under the SIR) to the base station (204). At the same time, the terminal performs error correction decoding of diffused data (203) and transmits a result of error detection (205) to the base station side.

Since the result is transmitted three slots after the reception, the error correction decoding is performed within the three slots. The base station determines whether to perform retransmission or whether to transmit new data based on the error detection result. When transmitting new data, the base station determines a terminal to be a transmission target based on the DRCs of all the terminals (206).

FIG. 3 shows a timing of data transmission at a base station according to the conventional technique. A data decoding result (302) of data transmitted at time 1 (301) is received at time 4. It is judged whether scheduling (303) is necessary or not based on the result, and it is determined whether to retransmit the data 301 transmitted at the time 1 or transmit new data as transmission data (304) at time 5.

Thus, it is necessary to wait for the data decoding result to be returned, and retransmission of data is performed every four slots. Therefore, each of the data at the times 1, 2, 3, and 4 can be independently transmitted, and the base station performs data transmission in four parallels. Description will be made below with a data transmission timing 1 as an example. Correspondence between time t1-1 etc. for each timing and absolute time is as shown in FIG. 3.

FIG. 4 shows a scheduling operation trigger of the conventional technique. The figure shows a case where, at time t1-4, retransmission of first data of a terminal A (hereinafter referred to as "A1") (401) ends (402); scheduling (403) is performed; the terminal A is selected; and at time t1-5, transmission of data A2 (404) is started. In addition to the case where the data decoding result indicates success of decoding, 402 is also effective in the case where the specified number of retransmissions has been reached.

The scheduling of the conventional technique is performed in two stages of selection based on the priority of held data and selection based on an evaluation index. FIG. 5 shows an example of a case where three terminals A, B, and C belong to a base station, the terminal A having data in each of queues 501, 502, and 503 for storing data with priorities 1, 2, and 3, the terminal B having data only in the queue 506 among queues 504, 505, and 506 for storing data with priorities 1, 2, and 3, the terminal C having data in the queues 508 and 509 among queues 507, 508, and 509 for storing data with priorities 1, 2, and 3. In this case, the terminal A having data in a queue with the highest priority 1 is determined to be a transmission target.

FIG. 6 shows an example of a case where three terminals A, B, and C belong to a base station, the terminal A having data in the queues 502 and 503 among queues 501, 502, and 503 for storing data with priorities 1, 2, and 3, the terminal B having data only in the queue 506 among queues 504, 505, and 506 for storing data with priorities 1, 2, and 3, the terminal C having data in the queues 508 and 509 among queues 507, 508, and 509 for storing data with priorities 1, 2, and 3. In this case, of the terminals A and C having data in a queue with the highest priority 2, the one that has a higher evaluation index to be notified is determined to be a transmission target.

FIG. 7 shows an operation flowchart of the conventional technique. First, the data decoding result of data transmitted last is received (step 701). If the step 701 shows that decoding has been successful or the specified number of retransmissions has been reached, a scheduling operation trigger is made effective (step 702). If the operation trigger for scheduling of the step 702 is effective, then, for all belonging terminals, information about transmission data with the highest priority and channel information to be notified are collected (step 703). If terminals having transmission data exist as a result of the step 703 (step 704), terminals having data with the highest priority are selected as candidates (step 705), and a terminal in which the evaluation index calculated from the channel information collected in the step 703 is the largest is determined to be a transmission target (step 706). Data started to be transmitted is deleted from a transmission queue and is stored in a deletion queue for a predetermined time in consideration of a possibility of retransmission control by a higher layer (step 707).

FIG. 8 shows a configuration of a terminal-side wireless communication device using a conventional method. A signal received by an antenna is converted into a baseband-band signal by a radio frequency circuit (801). The baseband-band signal is inputted to a modulation/demodulation unit (810), and demodulation processing such as detection is performed by a demodulator (802). Then, each coding unit of the signal is decoded by an error correction decoder (804). When decoding is performed by the error correction decoder (804), a demodulation result of the same data received in the past is added (803), and error correction decoding is performed as necessary. As for a result that has been of the error correction by the error correction decoder 804, an error detection unit (805) detects an error thereof, and receiving quality information indicating whether an error exists or not is created. The receiving quality information and the channel information are code-multiplexed with a pilot signal generated by a pilot signal generation unit (806) and a data signal which has been channel-coded by an error correction coder (807), by a multiplexer (808) of the modulation/demodulation unit (810). The multiplexed signal is modulated by a modulator (809) and sent out to a wireless channel via a radio frequency circuit (801).

The signal transmitted from the receiving-side wireless communication device is received by a base-station-side wireless communication device shown in FIG. 9. The base-station-side wireless communication device executes demodulation for all the terminals by a demodulation unit (906). The operations of 801, 802, and 803 are similar to those of the terminal-side wireless communication device. A channel information extraction unit (904) and a data decoding result extraction unit (905) extract the channel information and the data decoding result, respectively. A scheduler trigger creation unit (908) creates an operation trigger based on the data decoding result collected by 906 and the number of retransmissions managed by a number-of-retransmissions management unit (907), and a transmission data determination unit (909) determines transmission data based on the operation trigger and the collected channel information. The transmission data is moved to a data waiting to be deleted management unit (910), channel-coded by an error correction encoder (911), and code-multiplexed with a pilot signal generated by a pilot signal generation unit (912) by a multiplexer (913). The multiplexed signal is modulated by a modulator (914) and sent out to a wireless channel via a radio frequency circuit (901).

SUMMARY OF THE INVENTION

Disclosure of the Invention

A conventional system assumes that communication is performed with the use of a single carrier between a base station and a terminal. However, in consideration of a frequency-direction diversity effect, it is also thought effective to perform communication using a plurality of carriers at the same time, leading to a problem in that scheduling for the plurality of carriers as described above cannot be handled at present.

Therefore, a primary object of this invention is to provide a scheduling and retransmission control method that can handle simultaneous communication with the use of a plurality of carriers.

By causing channel information and a data decoding result to be notified for each of carriers to be used, and by managing the number of retransmissions, simultaneous retransmission control for a plurality of carriers is performed.

According to this invention, scheduling including retransmission control is possible even when communication is performed by simultaneously using a plurality of carriers between a base station and a terminal. Furthermore, it is also possible to improve communication quality of a particular terminal and improve the throughput of the entire system by making the most of the advantage of the plurality of carriers.

DETAILED DESCRIPTION OF THE PREFERRED EMBODIMENTS

Best Mode for Carrying out the Invention

Embodiments of this invention will be described with reference to the drawings.

First Embodiment

Figure 1:
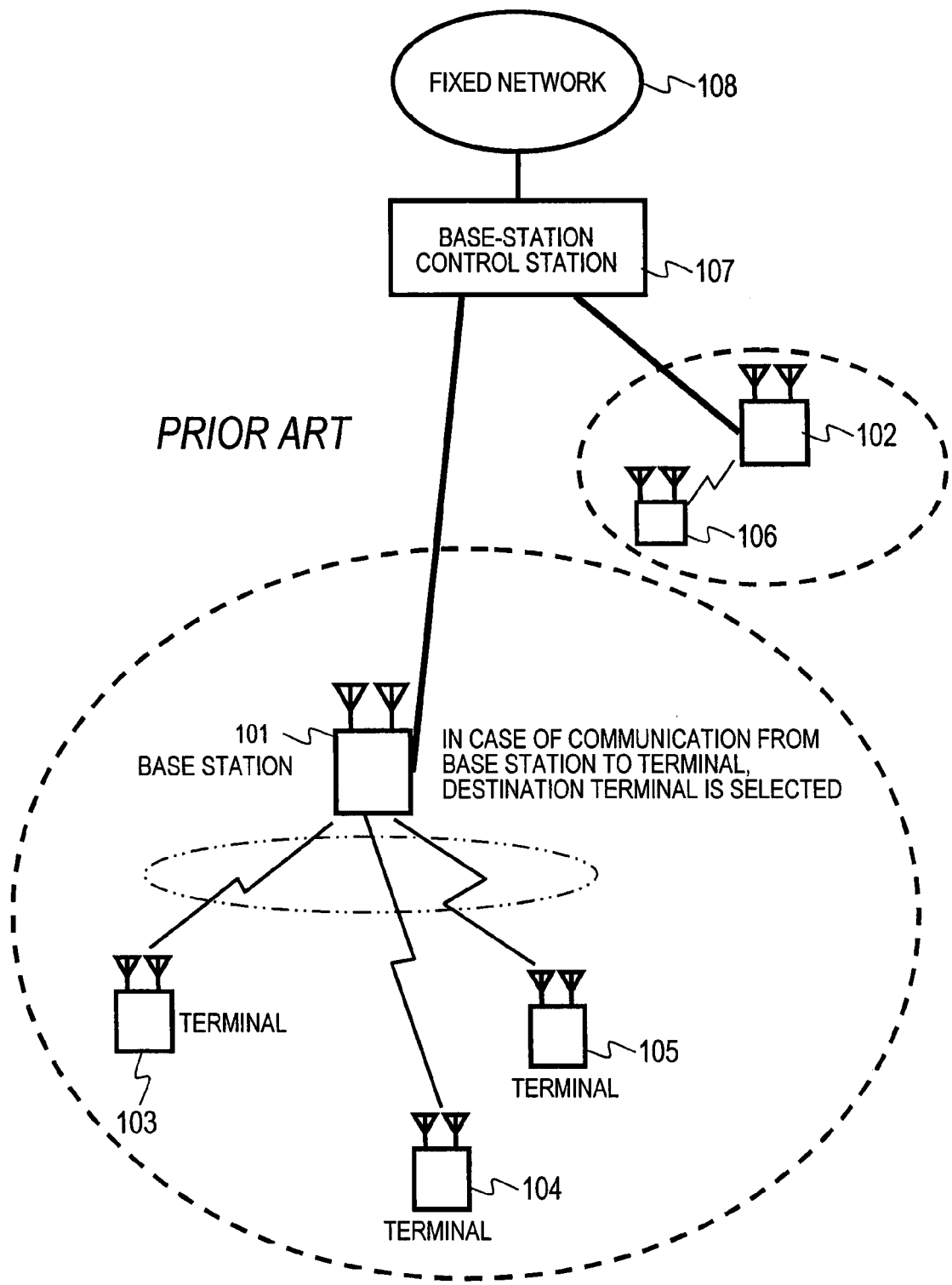
FIG. 1 is an entire configuration diagram of a general cellular communication system.
Figure 2:
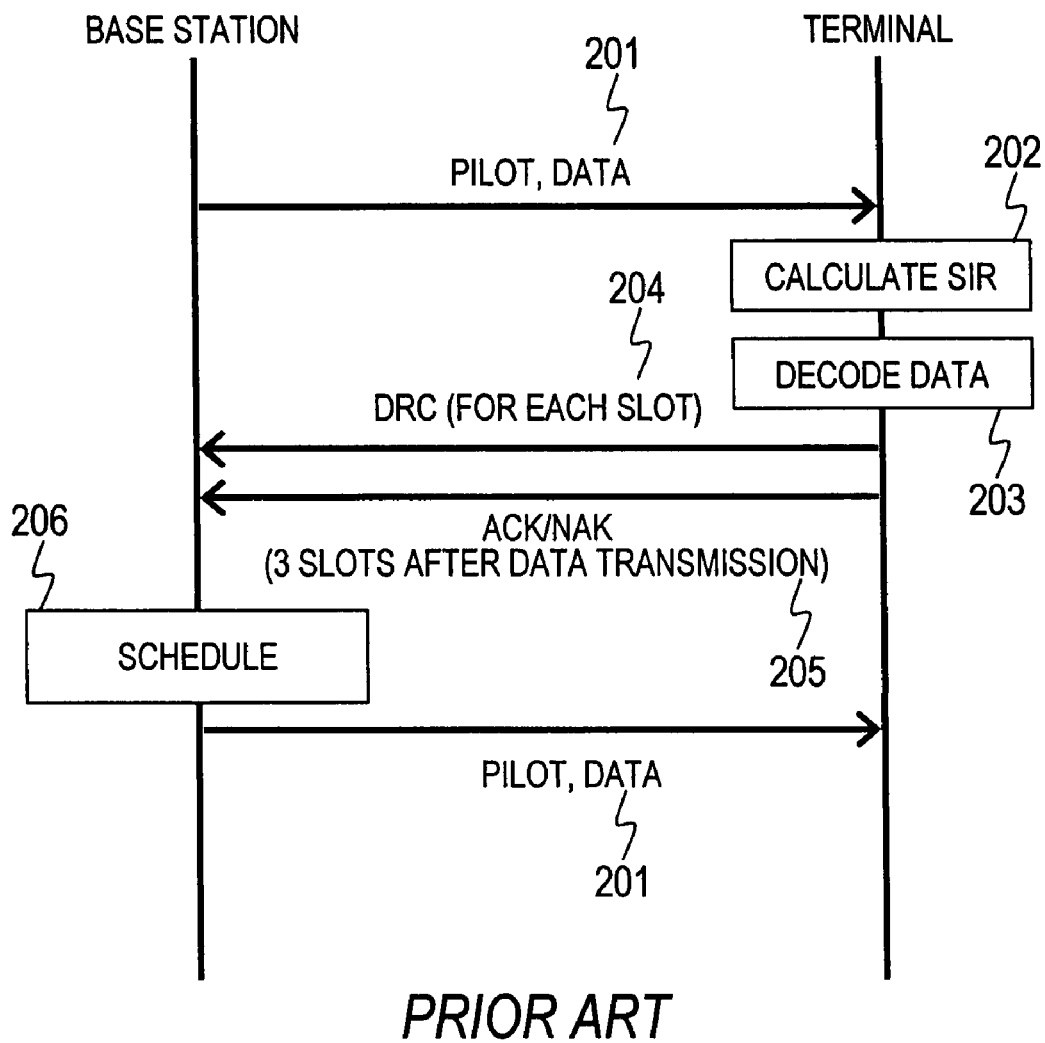
FIG. 2 is a control sequence diagram of a conventional technique.
Figure 3:
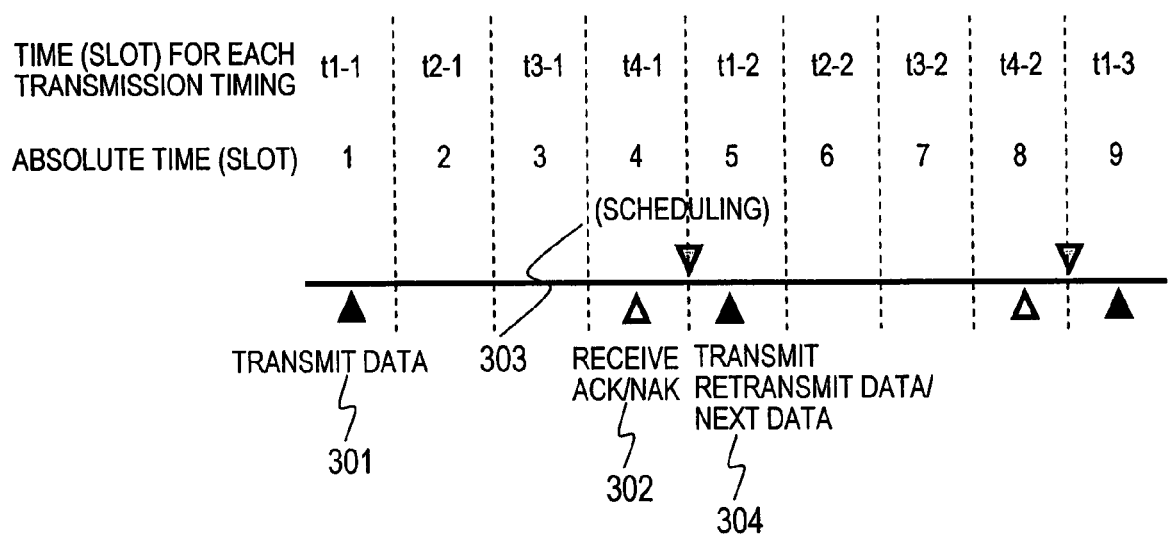
FIG. 3 is a timing diagram showing a retransmission control cycle of the conventional technique.
Figure 4:
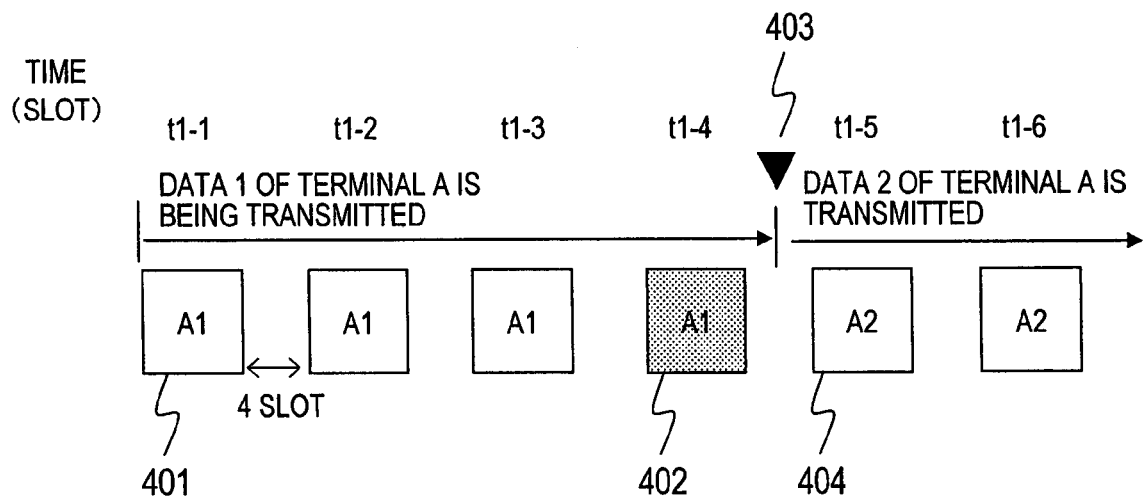
FIG. 4 is a timing diagram showing a scheduler operation trigger in retransmission control of the conventional technique.
Figure 4:
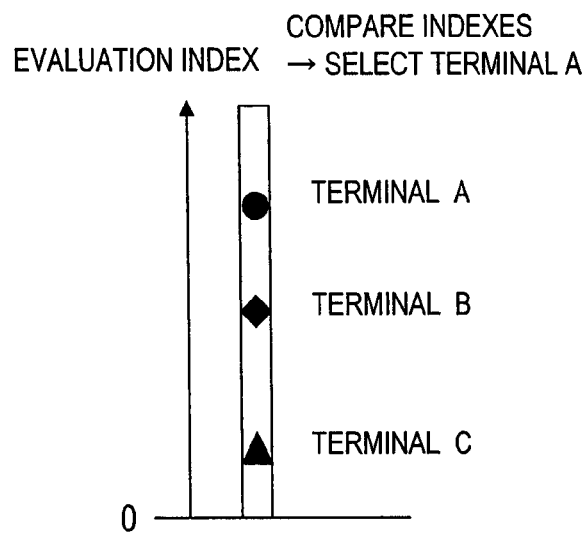
Figure 5:
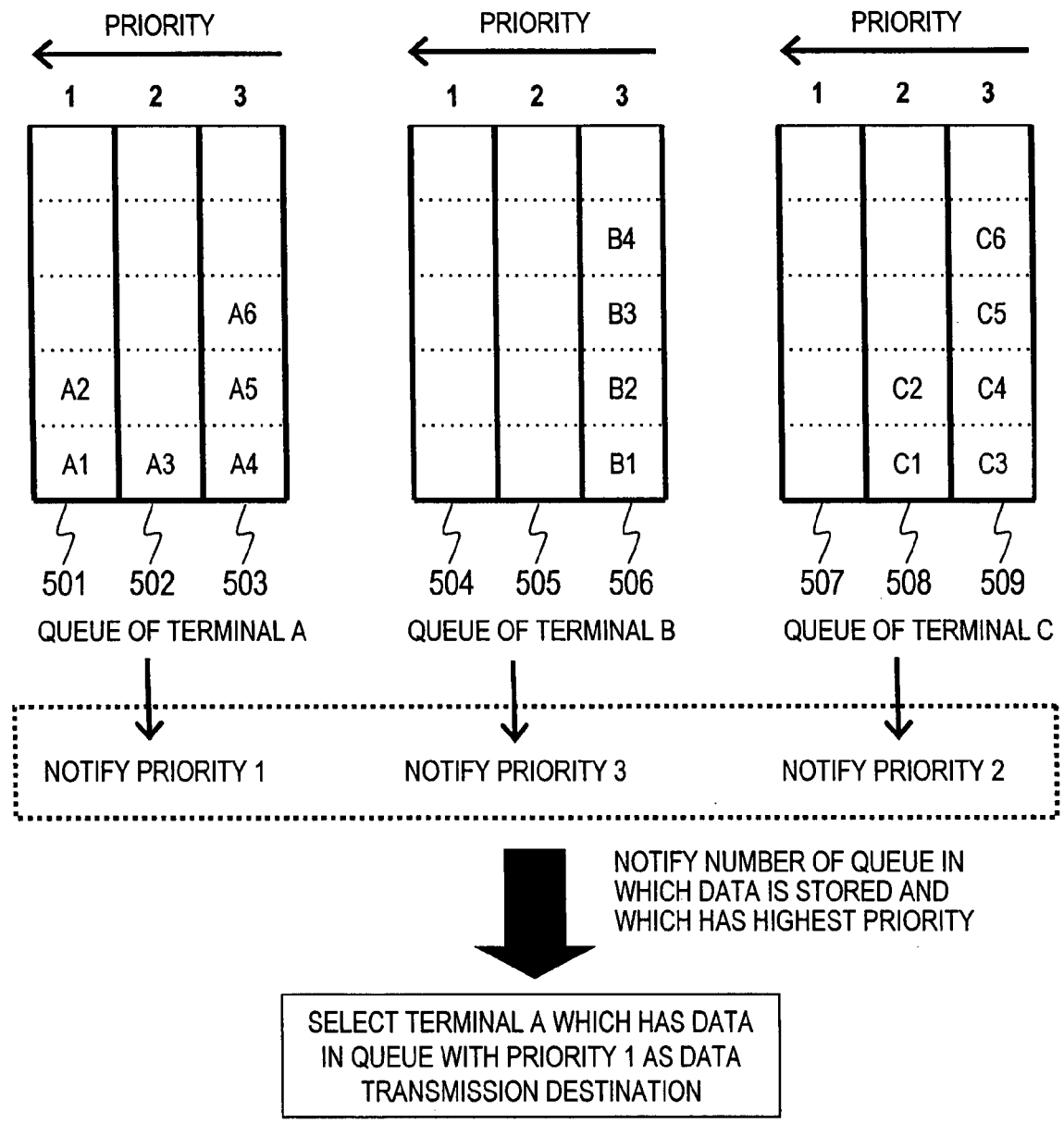
FIG. 5 is a diagram of an example in which candidates for scheduling are limited based on inter-queue priorities according to the conventional technique.
Figure 6:
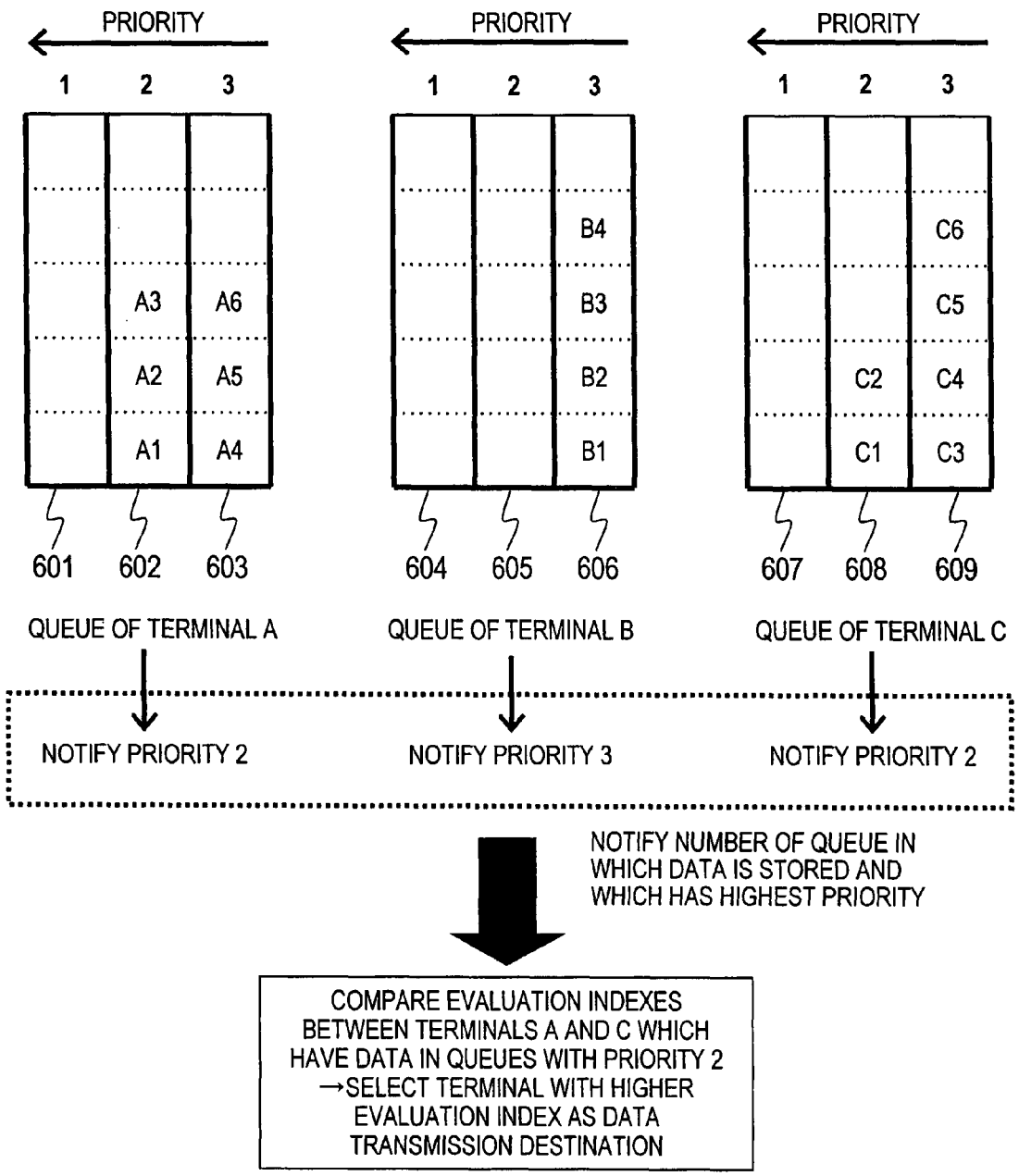
FIG. 6 is a diagram showing a method of determining a transmission target in a case where a plurality of terminals with the same inter-queue priority according to the conventional technique.
Figure 7:
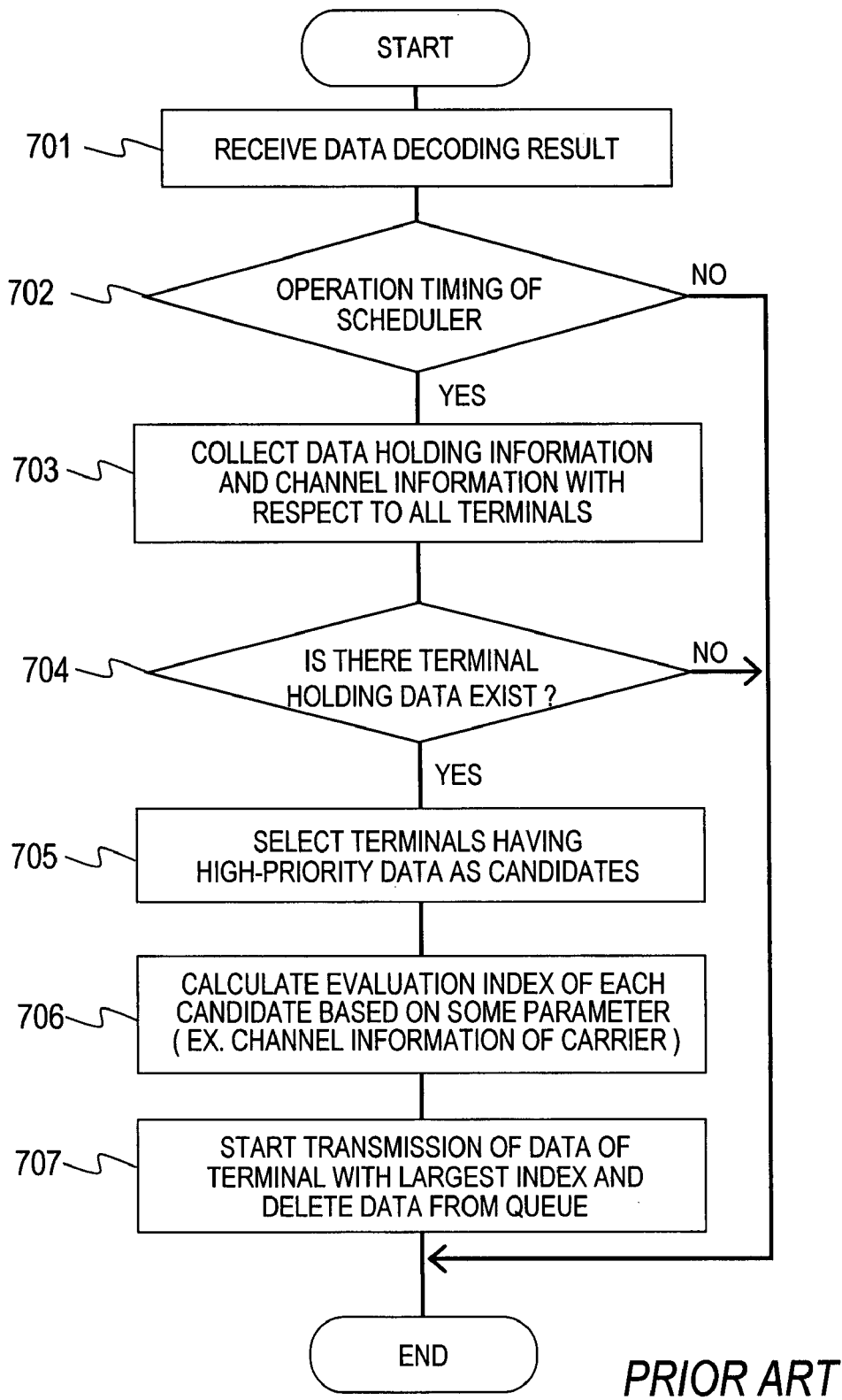
FIG. 7 is an operation flowchart of the conventional technique.
Figure 8:
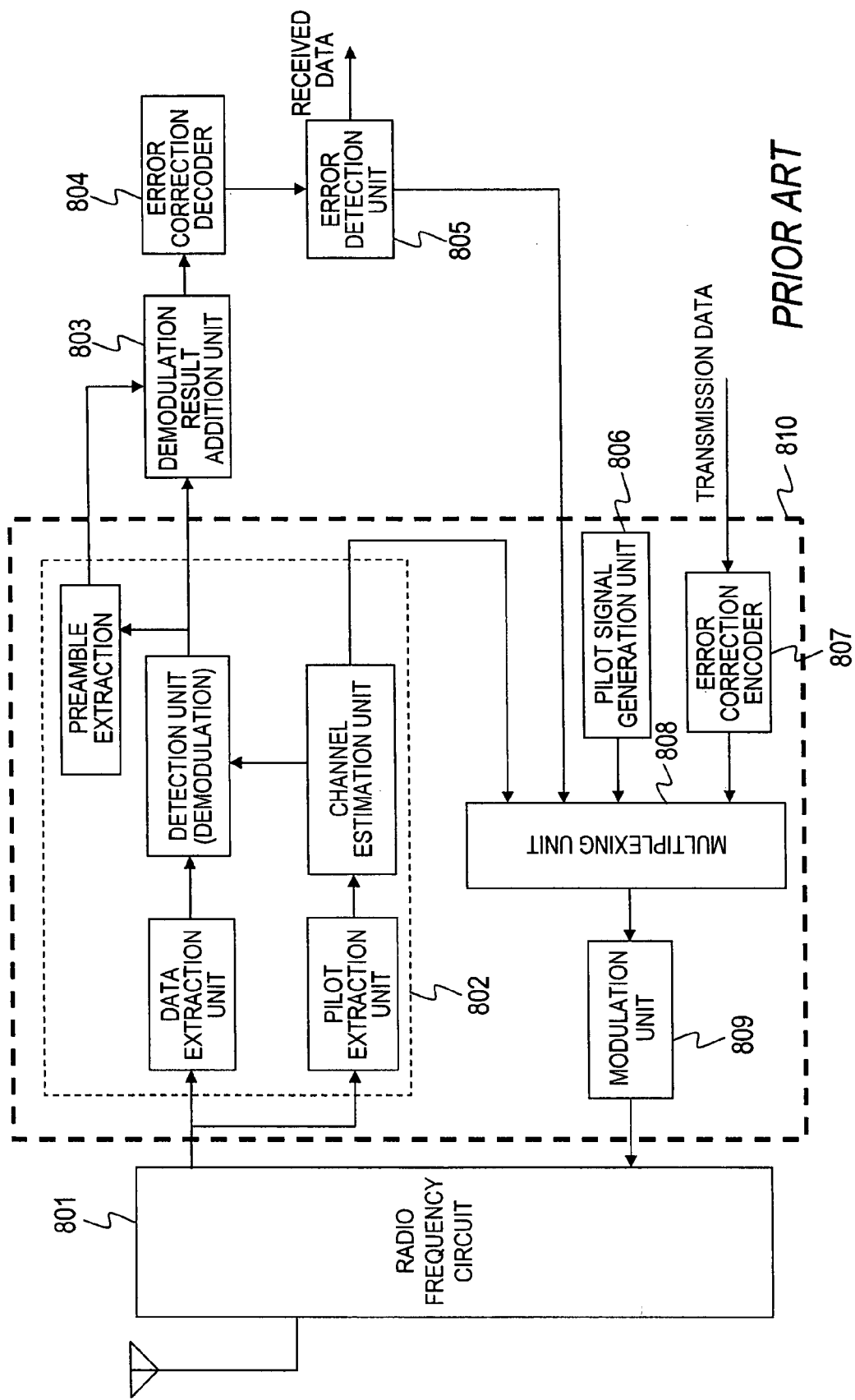
FIG. 8 is a block diagram of a configuration example of a terminal wireless communication device according to the conventional technique.
Figure 9:
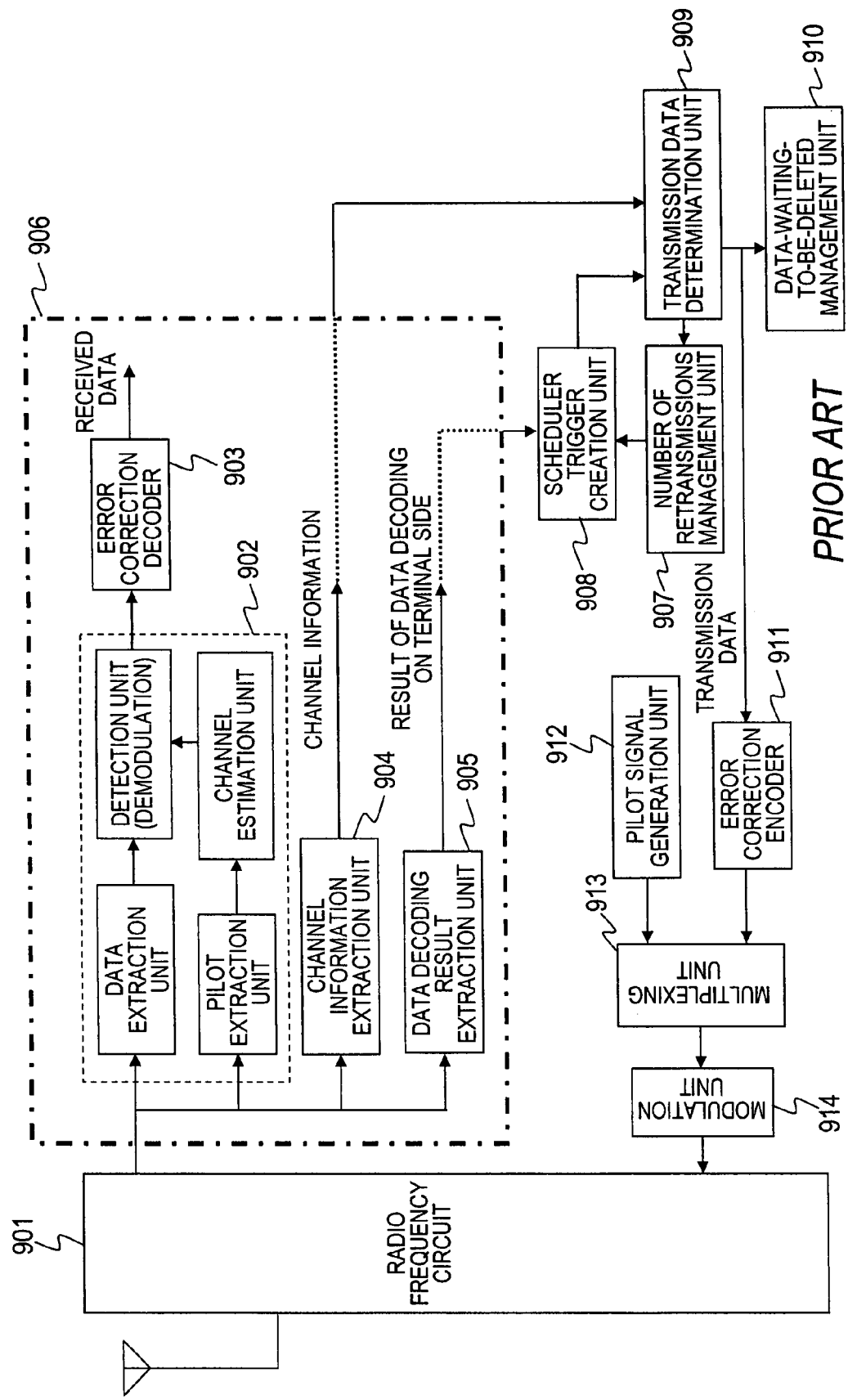
FIG. 9 is a block diagram of a configuration example of a base-station-side wireless communication device according to the conventional technique.

In this invention, a cellular communication system configuration similar to conventional one shown in FIG. 1 is used. The number of transmission destination terminals for each carrier is one, for each time, similarly to the conventional one. However, this system configuration is different from the conventional one in that communication is performed with the use of a plurality of carriers. For this reason, the amount of data which can be simultaneously transmitted for each time increases, and new retransmission control utilizing the characteristic is possible.

A retransmission control algorithm of this invention will be described below.

Figure 10:
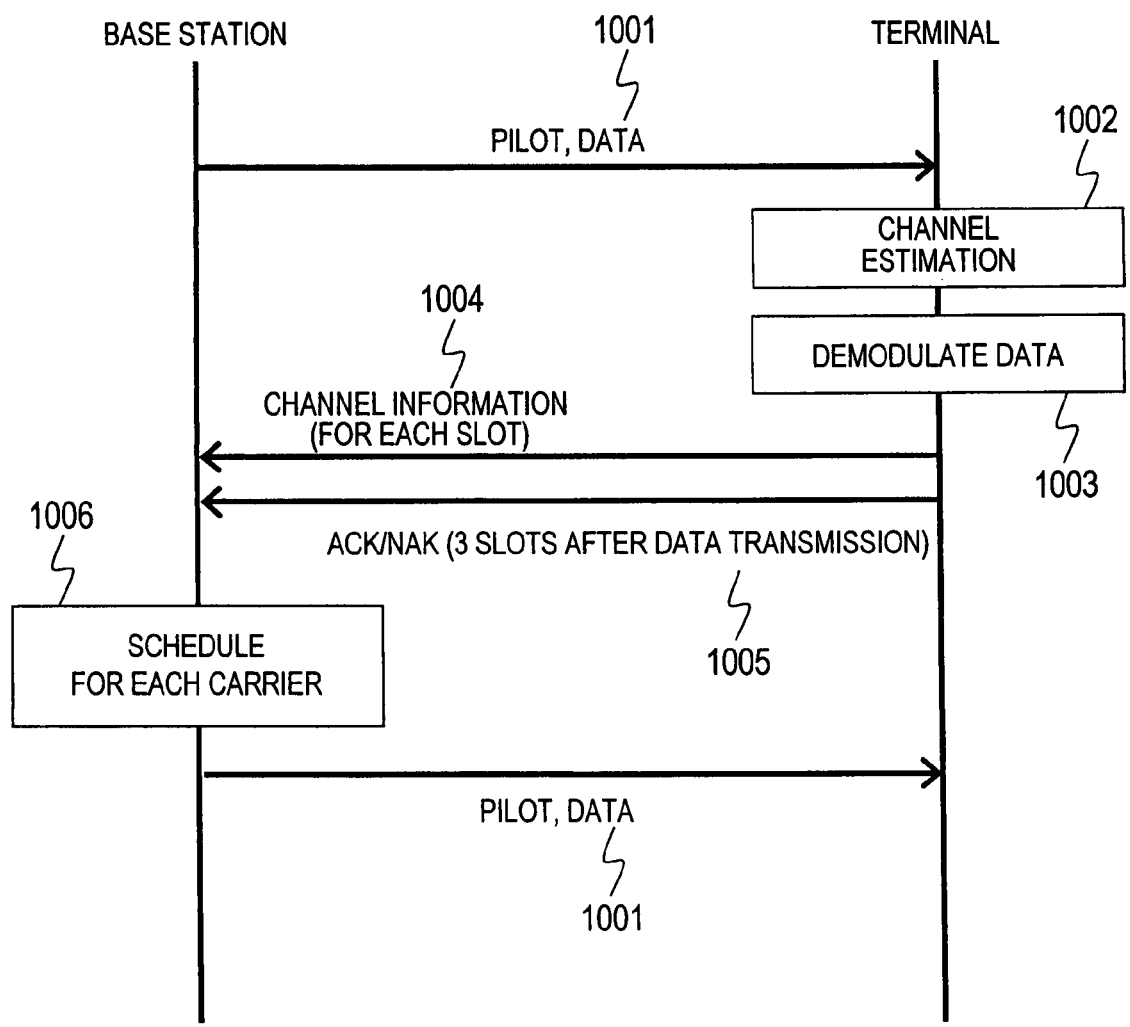
FIG. 10 is a control sequence diagram of a first embodiment of this invention.

FIG. 10 shows a control sequence of a first method of this invention. First, for each of carriers, a base station transmits a time-multiplexed signal (1001) of data and a pilot signal to a transmission target terminal. For all the carriers, the terminal calculates a signal-to interface power ratio (SIR) from the pilot signal (1002) and transmits channel information about each carrier to the base station side (1004).

A terminal for which there is received data performs, for each carrier in which the received data destined to the terminal exists, error correction decoding of the diffused data (1003) and transmits each error detection result indicating whether the data has been correctly decoded or not (1005) to the base station side. In scheduling of data existing in a transmission queue for each carrier (1006), the base station determines, for a carrier for which an error detection result has been notified, whether to perform retransmission or transmit new data based on the error detection result.

As for a carrier determined to be a carrier with which retransmission should be performed, the data which could not been decoded is retransmitted to a terminal which has notified an error detection result indicating that the data has not been correctly decoded. As for each of a carrier determined to be a carrier with which new data is to be transmitted and a carrier for which an error detection result has not been notified, a terminal to be a transmission target is determined with channel information about the carrier, from all the terminals, as an index.

Figure 11:
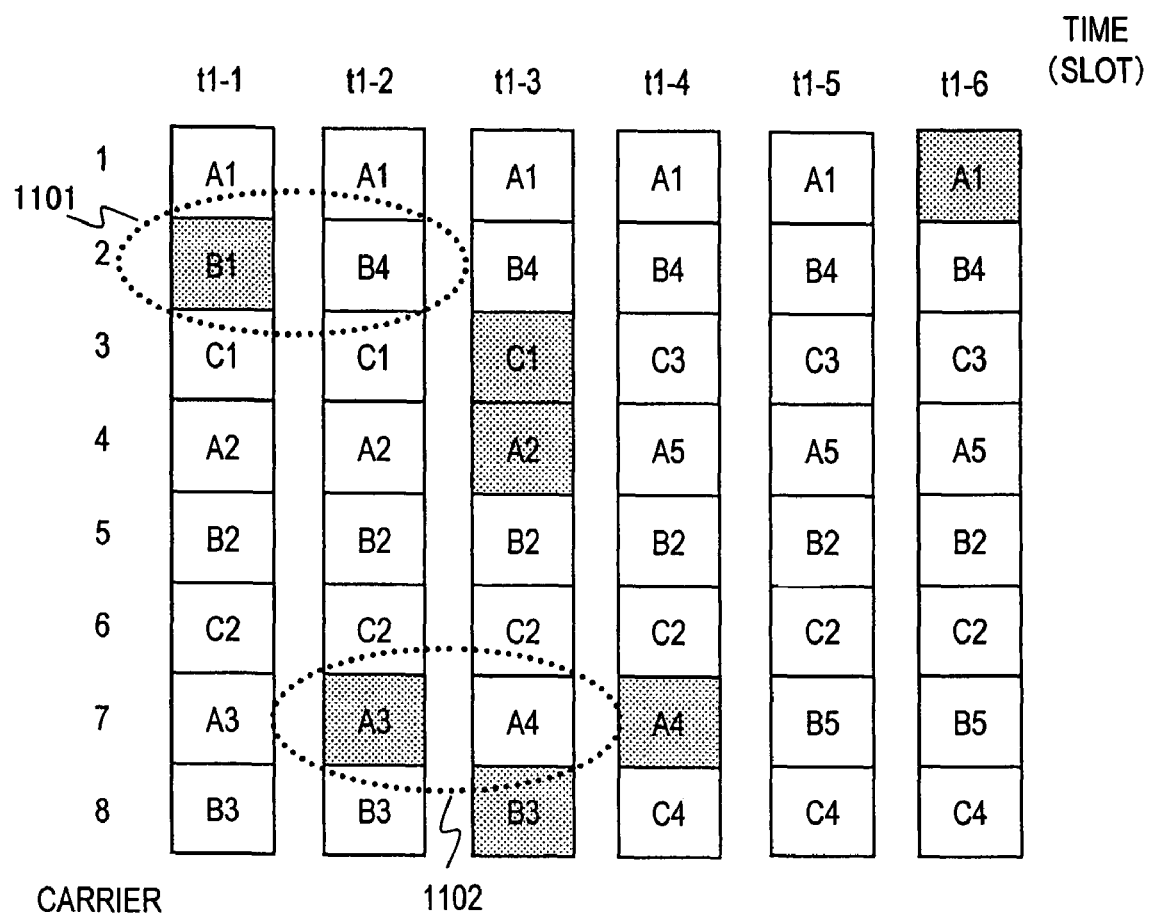
FIG. 11 is a conceptual diagram of retransmission control for each carrier according to the first embodiment of this invention.
Figure 12:
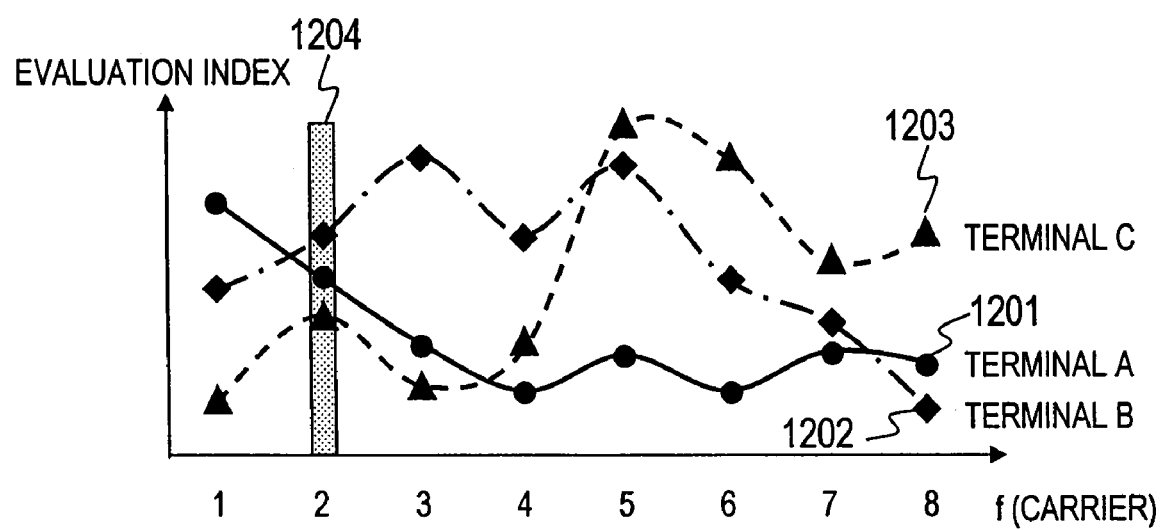
FIG. 12 is a diagram showing a method of determining a transmission target terminal for each carrier according to the first embodiment of this invention.

FIG. 11 and FIG. 12 show the concept of a scheduling operation according to the first method which is to be performed in the scheduling (1006) for each carrier.

FIG. 11 shows an example of a case of transmission of data A1, B1, C1, A2, B2, C2, A3, and B3 with carriers 1, 2, 3, 4, 5, 6, 7, and 8, respectively, at a time t1-1. The colored parts indicate carriers for which an operation trigger for scheduling for transmission of new data has become effective as a result of the data transmission and their slots. As for the slots of the other carriers, retransmission is performed at the next slot.

FIG. 12 shows channel information (1201, 1202, and 1203) about the carriers 1 to 8 of the terminals A, B, and C at the time t1-1. In this case, at the time t1-1, for example, it is determined to transmit new data with the carrier 2 (1101). In a case of the same priority, attention is paid only to the portions (1204) of the channel information (1201, 1202, and 1203) of the respective terminals, which correspond to the carrier 2. Then, the terminal B is selected as the next transmission target of the carrier 2, and at a time t1-2, transmission of data B4 is started. Similarly, attention is paid only to the carrier 7 at the time t1-2. Thus, for each of the carriers, the same configuration as that of the conventional technique is applicable.

Figure 13:
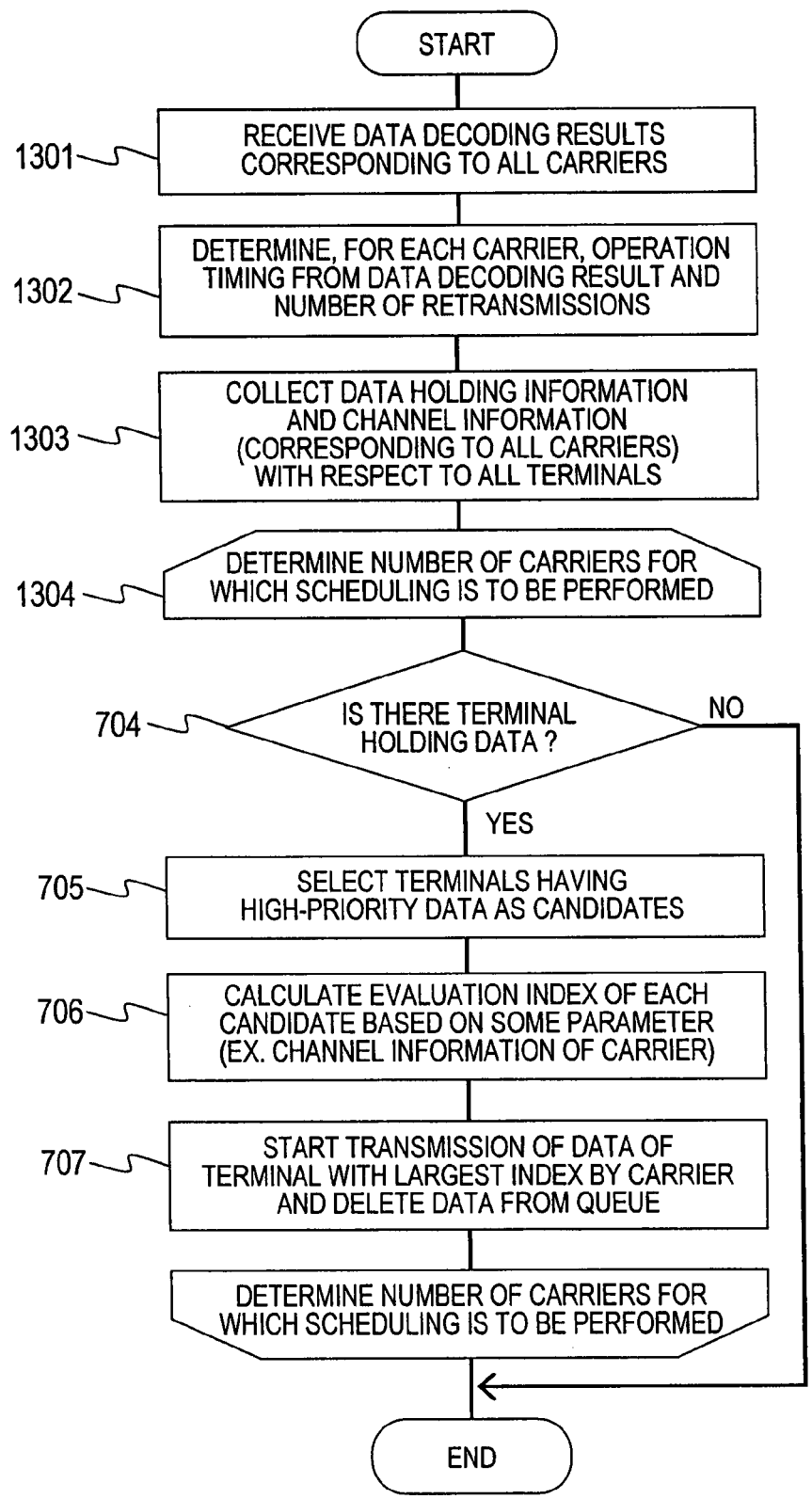
FIG. 13 is an operation flowchart of the first embodiment of this invention.

FIG. 13 shows an operation flowchart of the first method of this invention.

First, a data decoding result of the last transmission data for each carrier is received (step 1301). It is determined, for each carrier, whether to perform retransmission or transmit new data based on a criterion similar to that in the step 701 described above (step 1302).

For all the terminals, information about transmission data with the highest priority and channel information about each carrier notified from the terminals are collected (step 1303). For all of the carriers with which new data is to be transmitted (step 1304), transmission target terminals are determined in a procedure similar to that of the steps 704 to 707 described above. Data started to be transmitted is stored in a deletion queue for a predetermined time similarly to the conventional technique.

Thus, according to the first method of parallelizing conventional schedulers, an effect of increasing the number of data which can be simultaneously transmitted by the number of carriers and an effect of enabling communication with each terminal with a carrier in a good channel condition can be obtained.

Next, a second method of performing the scheduling (1006) for each carrier will be described. The second method of this invention accelerates completion of data retransmission by further utilizing a plurality of carriers for simultaneous transmission.

Figure 14:
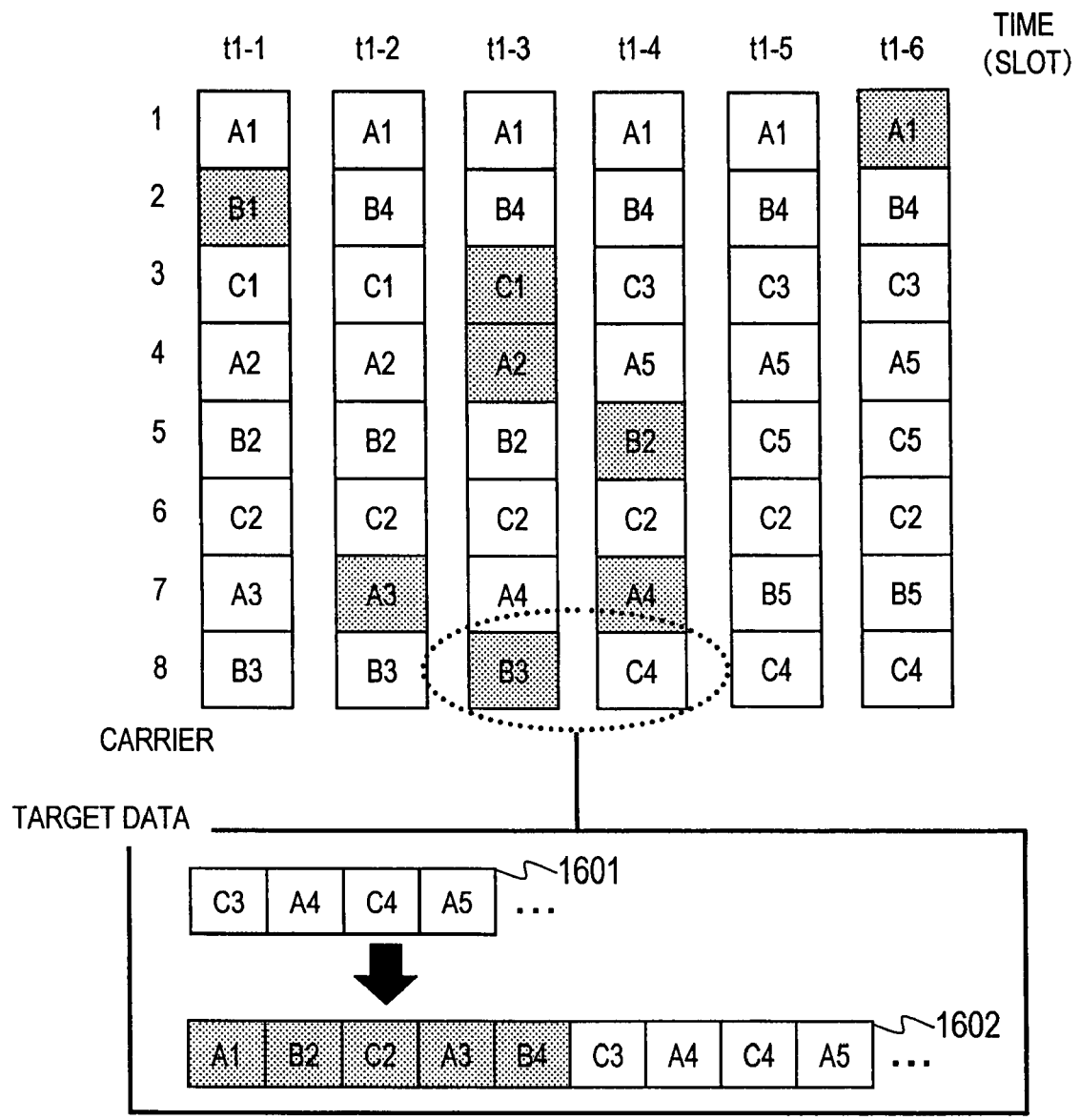
FIG. 14 is a conceptual diagram of a method of accelerating completion of retransmission according to the first embodiment of this invention.

For example, in a case of FIG. 14, scheduling is possible for the carriers 3, 4, and 8 when a time t1-3 ends, and the items of data A1, A3, B2, B4, and C2 are being retransmitted. In this case, only new transmission data are candidates for scheduling in the first method as indicated by 1701, while, in the second method, by rethrowing data having not been retransmitted yet into the transmission queue as candidates for scheduling, as indicated by 1702, and by transmitting the data having not been retransmitted yet in parallel with the use of the other carriers, time required for completion is shortened. In this case, it is also possible to manage new transmission data and data for retransmission by separate queues to give priority to the data for retransmission.

That is, when an HARQ is unterminated, data being transmitted (already selected) is also targeted by scheduling.

Figure 15:
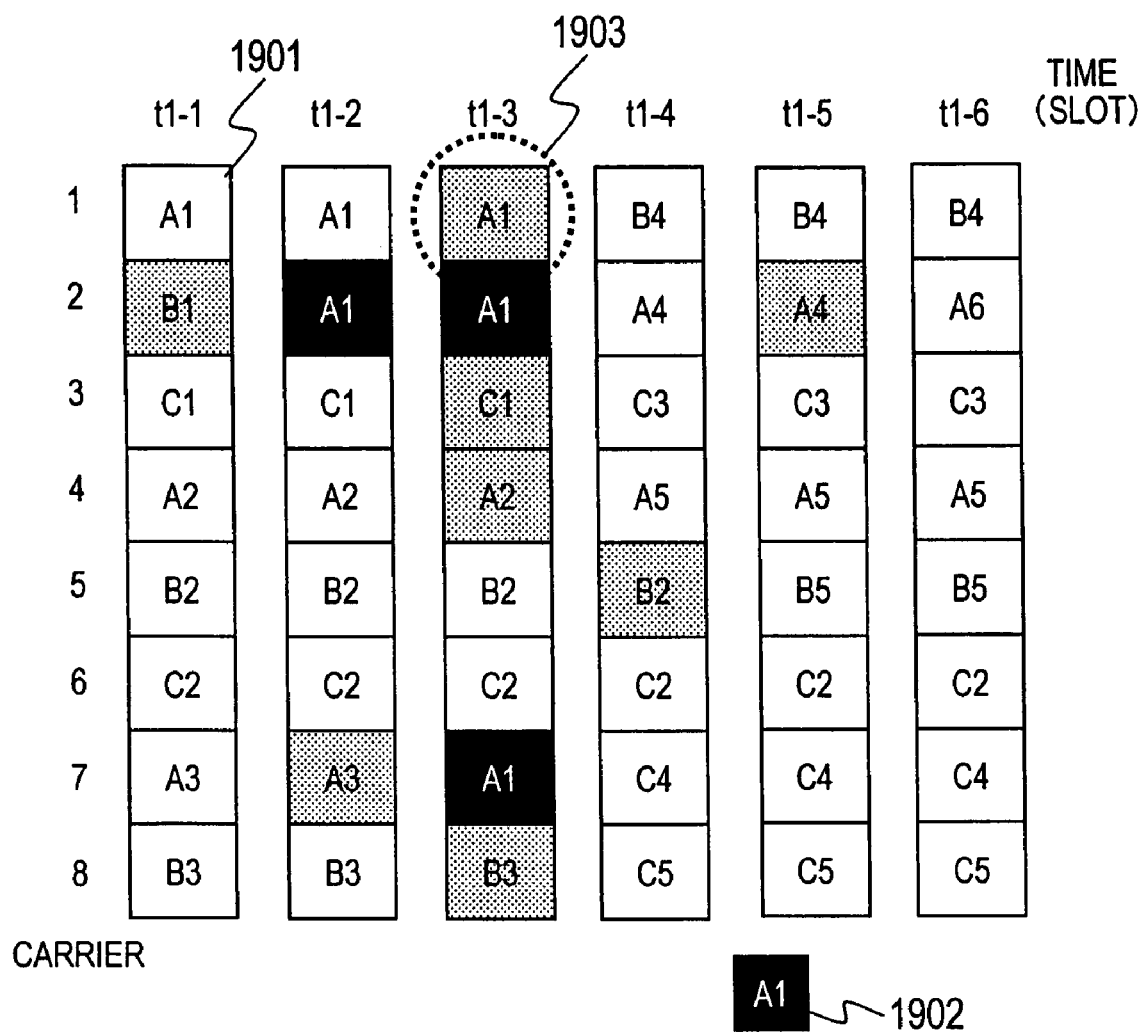
FIG. 15 is a diagram showing an example of acceleration of terminal velocity according to the first embodiment of this invention.

FIG. 15 shows an example of shortening the time for completion of retransmission with the use of the second method of this invention. Data A1 is assumed to be data the decoding of which is completed when receiving is performed six times. By simultaneously transmitting the data A1 using a carrier 2 from a time t1-2 and further using a carrier 7 from a time t1-3, receivings corresponding to six times are completed at the time t1-3, and decoding of the data A1 is also completed. Therefore, the time required until completion of decoding, which conventionally corresponds to six slots, is shortened to three slots (1903).

Second Embodiment

Figure 16:
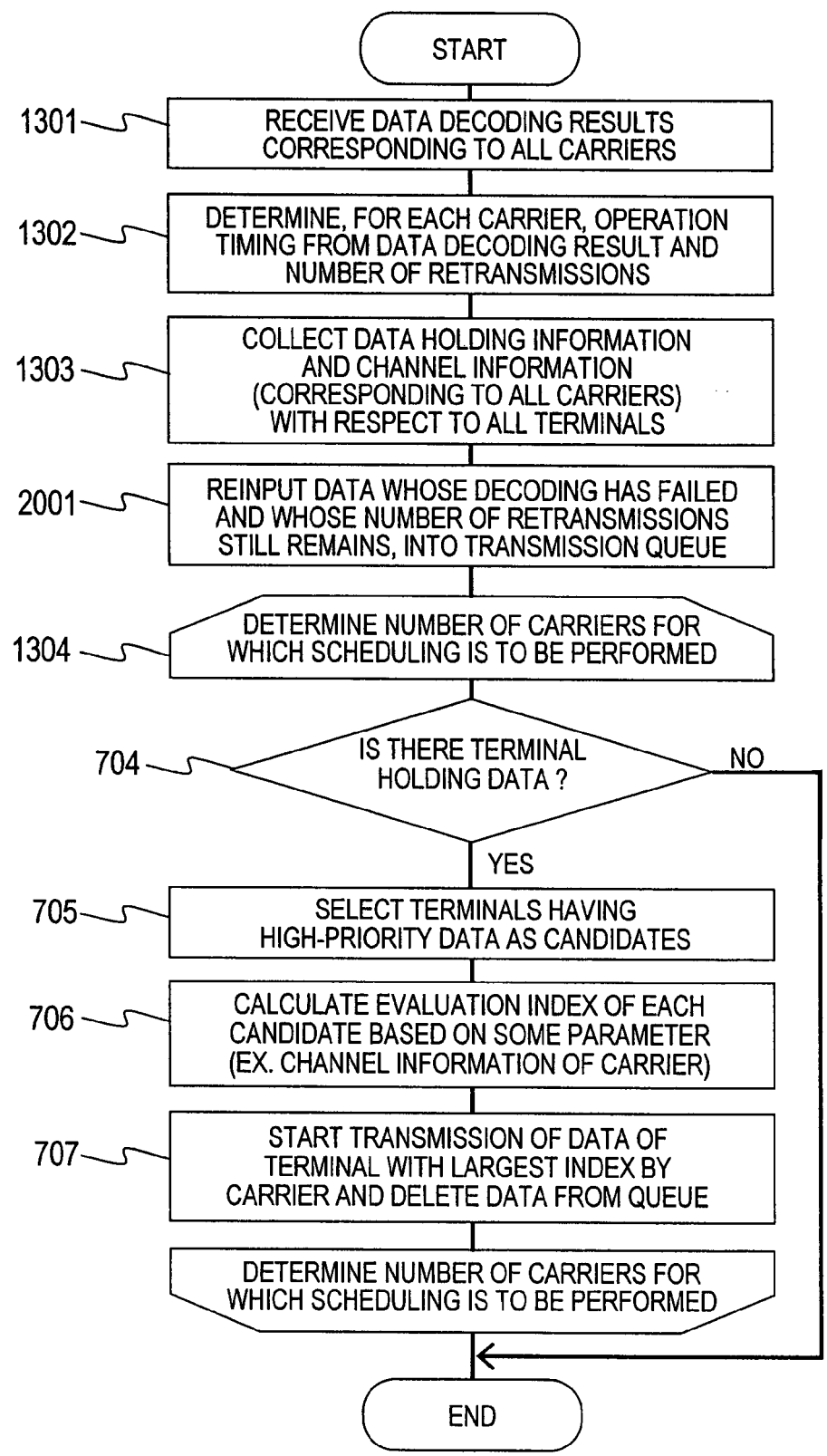
FIG. 16 is an operation flowchart of a second embodiment of this invention.

FIG. 16 shows an operation flowchart of the second method of this invention. The operations of 1301 to 1304 are similar to those of the first method. At the time of collecting data to be candidates for scheduling, an operation of rethrowing data for which the remaining number of retransmissions is more than one, among data the decoding of which has failed (the data decoding result (step 1301) indicates failure of decoding), into a transmission queue (step 2001) is added. By adding the rethrown data to the candidates for scheduling, it is possible to shorten the time required from start to completion of transmission of data.

According to the second method, an effect of shortening the time required until completion of retransmission of all data is obtained.

Third Embodiment

A third embodiment of this invention to be described next is a method intended to improve the utilization efficiency of carrier resources. According to the third method, the utilization efficiency of communication resources is improved by performing the rethrowing of the second method only when new transmission data does not exist.

Figure 17:
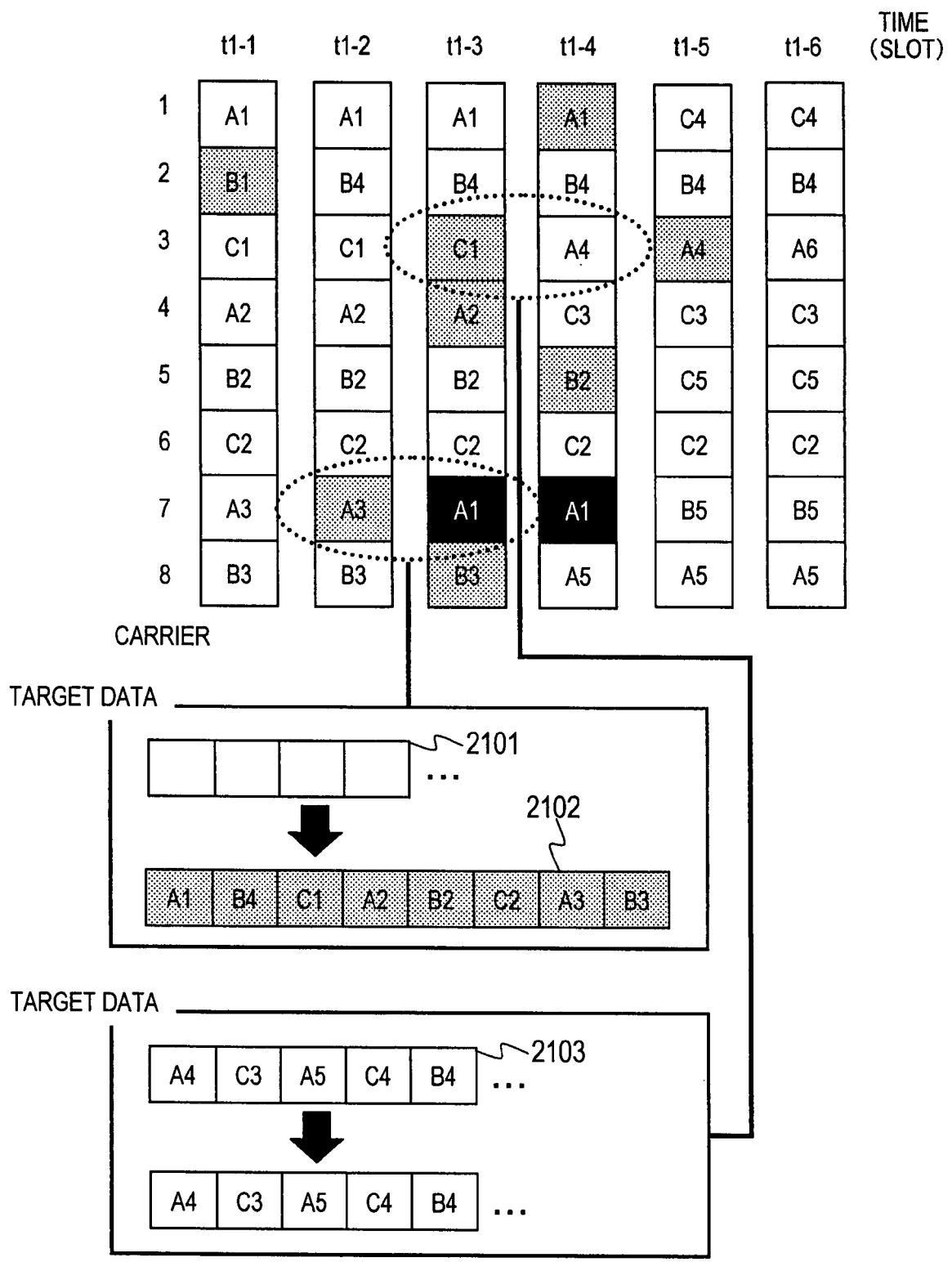
FIG. 17 is a conceptual diagram of a third embodiment of this invention.

For example, in a case of FIG. 17, since new data does not exist at the time t1-2 (2101), the data the retransmission of which has not been completed yet is rethrown (2102), and parallel transmission of data A1 is started with a carrier 7. On the other hand, since new data exists at the time t1-3 (2103), rethrowing of data is not performed, and transmission of data A4 is started with a carrier 3.

Here, though the criterion for determining the data to be rethrown is similar to that of the second method, the third method is different from the second method in that it is necessary to lower the priority of the rethrown data relative to new transmission data.

Figure 18:
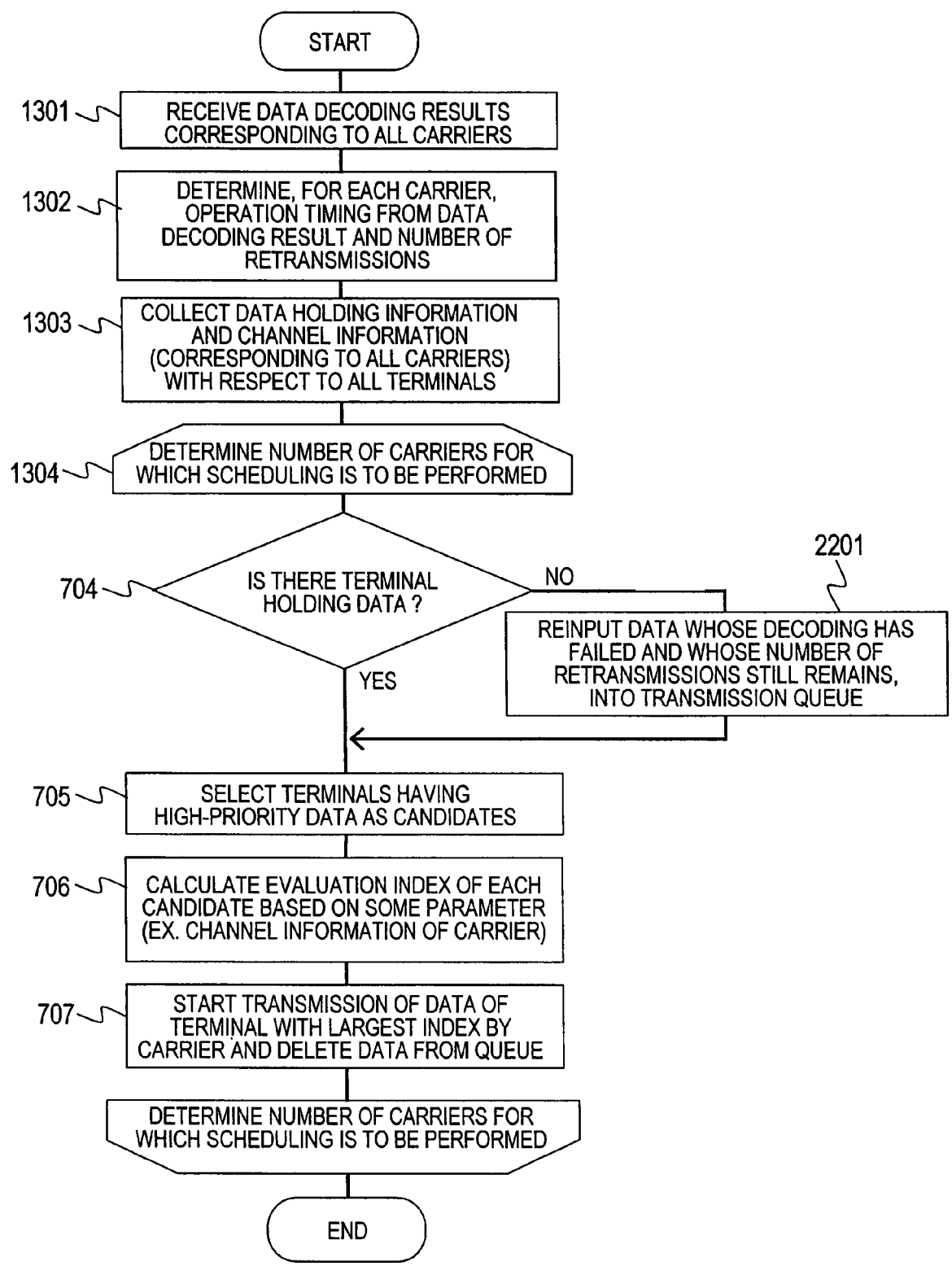
FIG. 18 is an operation flowchart of the third embodiment of this invention.

FIG. 18 shows an operation flowchart of the third method of this invention. The operations of 1301 to 1304 are similar to those of the first method. At the time of collecting data to be candidates for scheduling, an operation of rethrowing the data the decoding of which has failed into a transmission queue (2201) is added if a terminal having data does not exist.

(System Configuration)

Description will be made on a system and apparatus configuration for implementing the above-mentioned algorithms.

Figure 19:
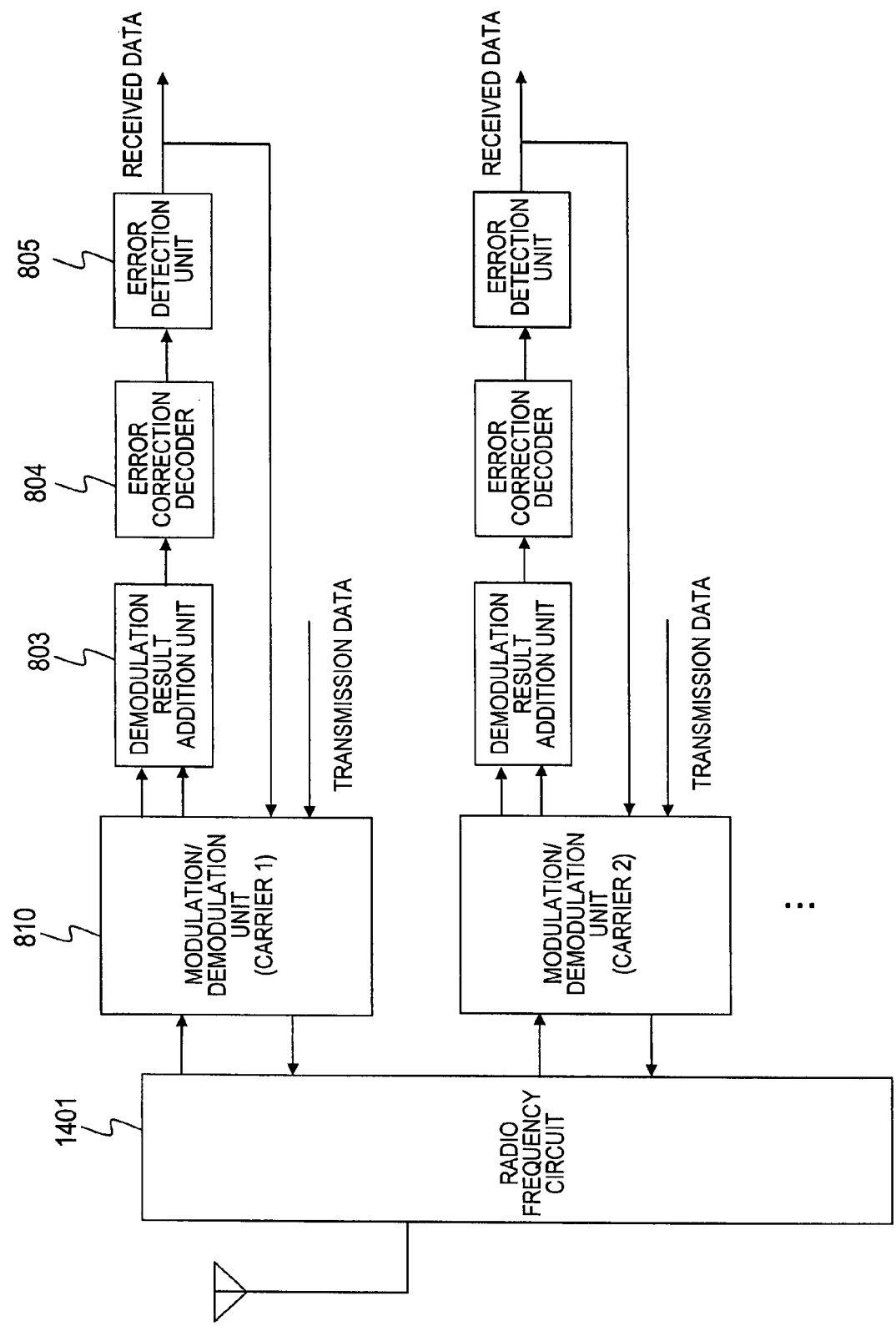
FIG. 19 is a block diagram of a configuration example of a terminal wireless communication device according to the first embodiment of this invention.

FIG. 19 shows a first terminal-side wireless communication device configuration for implementing the first method of this invention. The operations of an error correction decoder 804, an error detection unit 805, an error correction encoder 807, and a modulation/demodulation unit 810 are similar to those of the terminal-side wireless communication device with the conventional configuration. However, as more than one carriers are provided, the number of processing systems including the error correction decoder 804, the error detection unit 805, the error correction encoder 807, and the modulation/demodulation unit 810 increases by the number of the carriers.

Signals received by an antenna are converted to baseband signals via a radio frequency circuit 1401, (allocated to the processing units of the systems) different among the carriers, and then data receiving processing including error correction decoding is performed in a procedure similar to that for the conventional configuration. The data decoding result and channel information generated for each carrier are code-multiplexed and modulated by the modulation/demodulation unit 810. The created modulated signals corresponding to all the carriers are frequency-multiplexed by the radio frequency circuit (1401) and sent out to a wireless channel. As for carriers with which no data has been received, the data decoding result is not transmitted. However, the channel information is transmitted for all the carriers.

Figure 20:
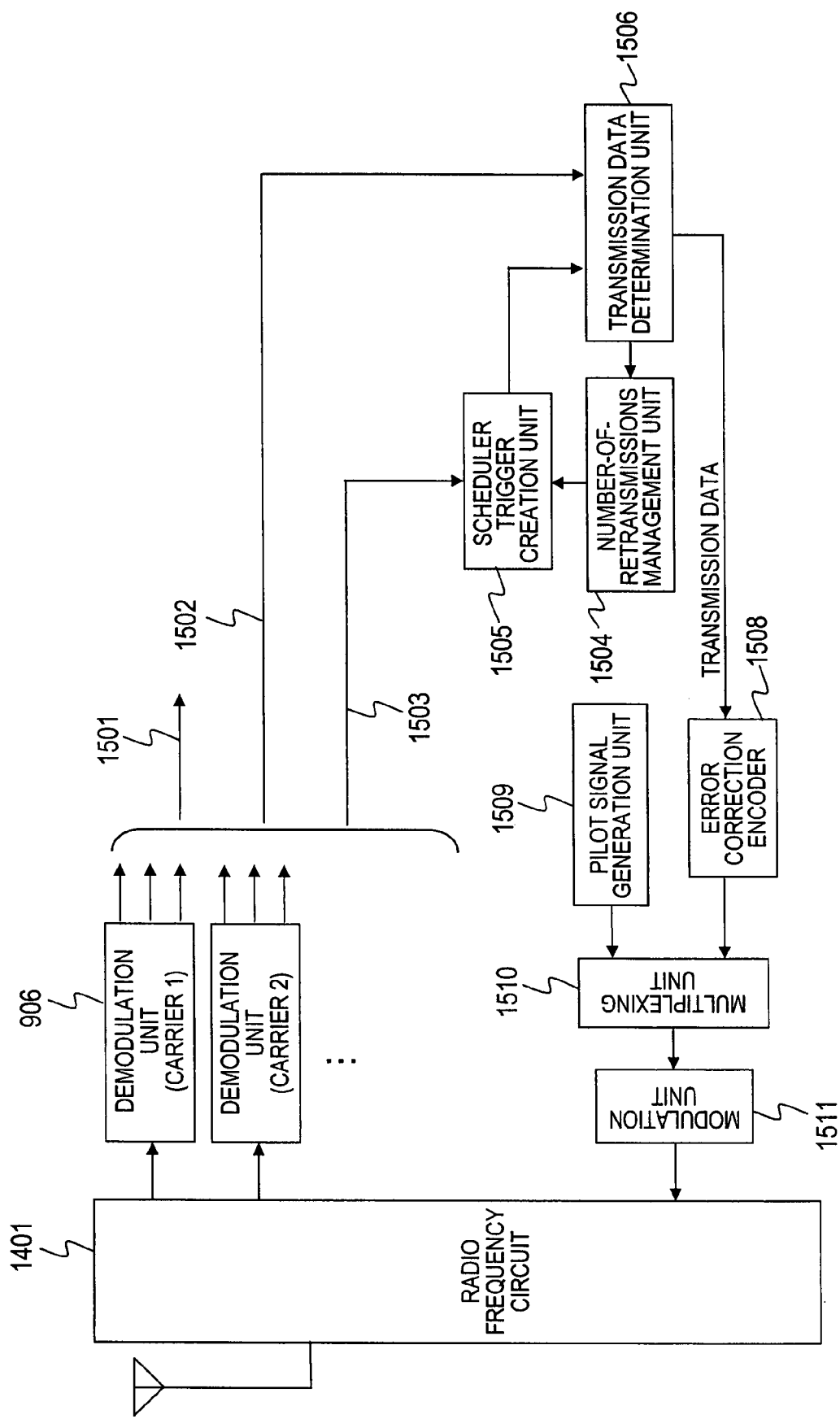
FIG. 20 is a block diagram of a configuration example of a base-station wireless communication device according to the first embodiment of this invention.

The signals sent out from the receiving-side wireless communication device are received by a base-station-side wireless communication device with a first configuration shown in FIG. 20. The operation of a demodulation unit 906 is similar to that of the base-station-side wireless communication device with the conventional configuration. The received signals are converted to baseband signals via a radio frequency circuit 1401, and the received data, channel information, and data decoding results corresponding to all the terminals are outputted by different demodulation units 906 according to carriers.

The outputs corresponding to all the carriers are collected, and received data (1501), channel information (1502), and data decoding results (1503) are created. Based on the number of retransmissions for each carrier managed by a number-of-retransmissions management unit (1504) and the data decoding results (1503), a scheduling operation trigger creation unit (1505) sets an operation trigger for each carrier.

A transmission data determination unit (1506) determines transmission data for each carrier based on the operation trigger and the channel information (1502). Channel coding is performed by an error correction encoder (1508), and multiplexing with a pilot signal generated by a pilot signal generation unit (1509) is performed by a multiplexer (1510). The multiplexed signal is modulated by a modulator (1511) and sent out to a wireless channel via the radio frequency circuit (1401).

The transmission data determination unit (1506) has a register for storing the number of next transmission data corresponding to the number of carriers for each transmission timing and a memory for storing data existing in transmission queues. The transmission data determination unit (1506) has a function of determining the next transmission data based on scheduler operation triggers for all the carriers and channel information about all the carriers of all the terminals, and a function of outputting the determined transmission data. The determination of transmission data is realized by determining, for a carrier for which the scheduler operation trigger is effective, a terminal to be the next transmission destination from among terminals having data in the transmission queue, based on the channel information about the carrier, and updating a part of the register storing transmission data which corresponds to the carrier, with new transmission data of the terminal. Output of the transmission data is realized by outputting the content of the updated register corresponding to all the carriers.

Figure 21:
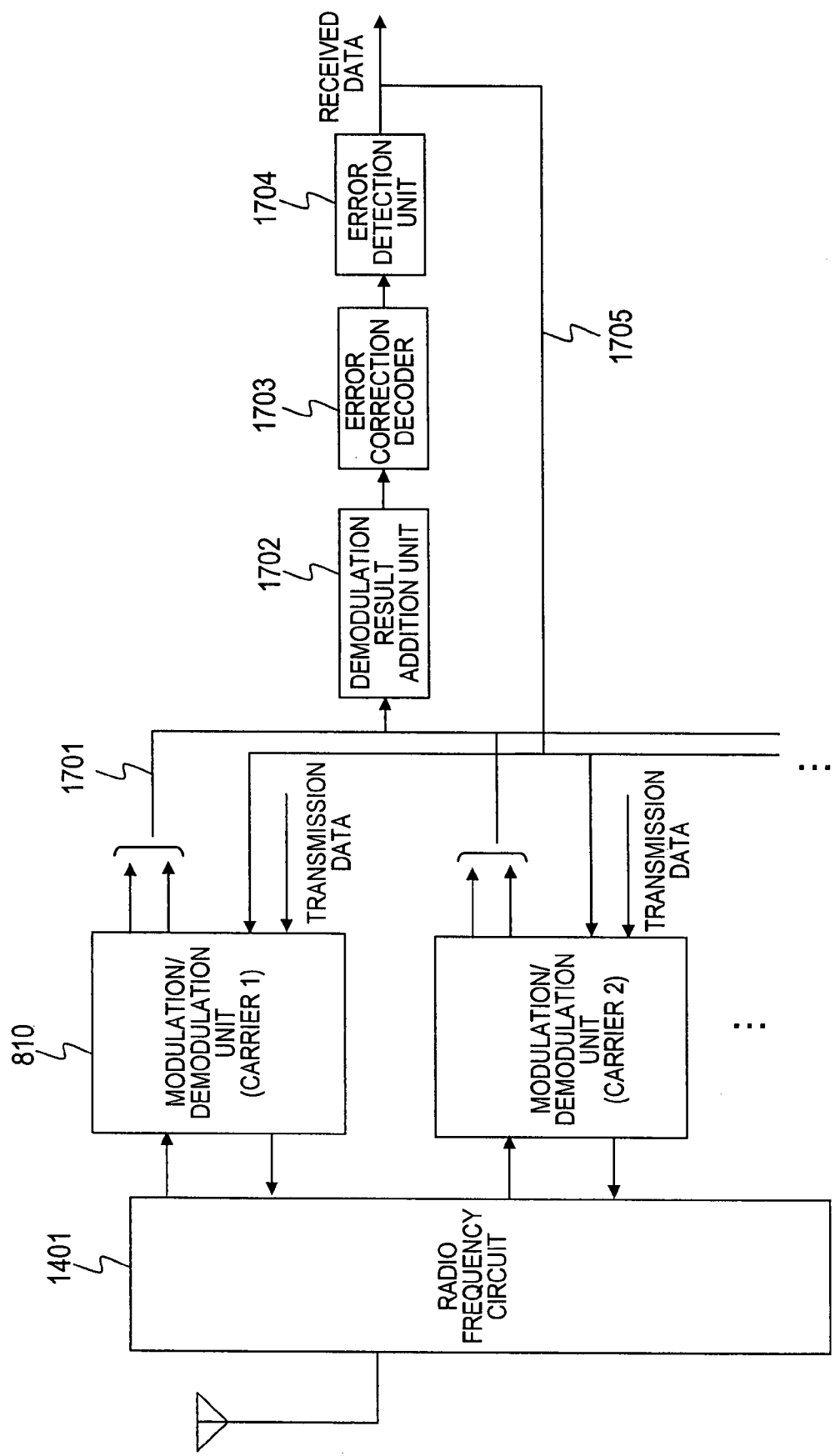
FIG. 21 is a block diagram of a configuration example of a terminal-side wireless communication device according to the second embodiment of this invention.

Next, FIG. 21 shows a second terminal-side wireless communication device configuration for implementing the second method of this invention. The operations of a radio frequency circuit (1401) and a modulation/demodulation unit (810) are similar to those of the terminal-side wireless communication device with the first configuration. This configuration is different from the first terminal-side wireless communication device configuration in that, since there is a possibility of simultaneous retransmission of the same data by a plurality of carriers, addition of a demodulation result (1702) and error correction decoding (1703) are performed based on demodulation results for and preamble information (1701) about all the carriers. In this case, an error detection result (1705) obtained from an error detection unit (1704) is input to all the carriers corresponding to the data.

Figure 22:
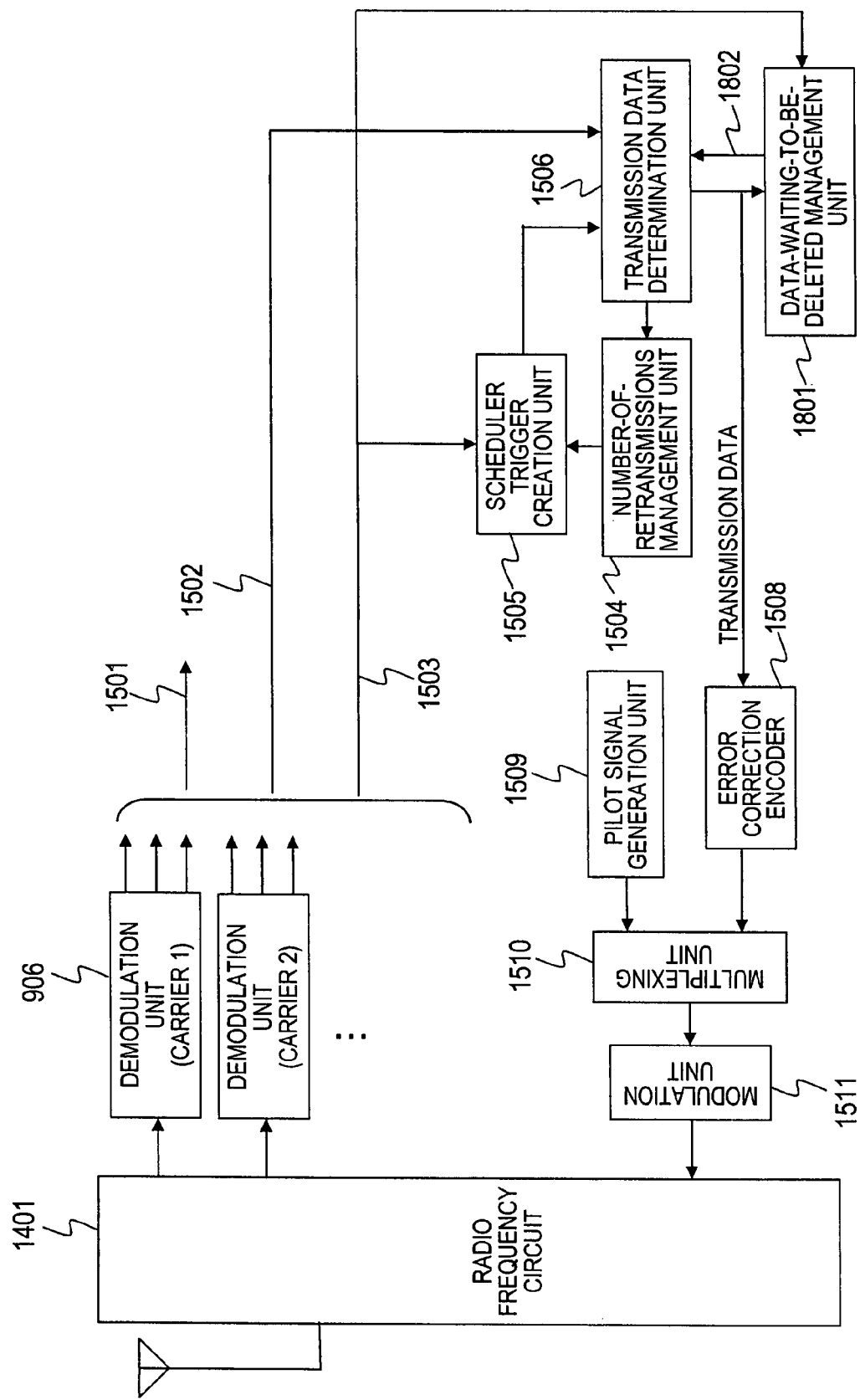
FIG. 22 is a block diagram of a configuration example of a base-station-side wireless communication device according to the second embodiment of this invention.

FIG. 22 shows a second base-station-side wireless communication device configuration. Operations other than those of a data-waiting-to-be-deleted management unit (1801) and a transmission data determination unit (1506) are similar to those of the base-station-side wireless communication device of the first embodiment. The data-waiting-to-be-deleted management unit (1801) has a function of storing data determined to be a transmission target by the transmission data determination unit (1506) in a memory for a predetermined period of time, and a function of, with a data decoding result (1503) and the remaining number of retransmissions of data being transmitted for each carrier as input, rethrowing (1802) data the decoding of which has failed and for which the remaining number of retransmissions is more than one, into the transmission queue of the transmission data determination unit (1506).

In order to implement the third method of this invention, a configuration is possible in which information indicating whether or not new transmission data exists in the transmission queue of the transmission data determination unit (1506) is transferred from the transmission data determination unit (1506) to the data-waiting-to-be-deleted management unit (1801).

As a data retransmission method, in addition to the above-mentioned method of enhancing the possibility of success of decoding by repeatedly transmitting the entire code words and improving the signal power on the receiving side by the retransmission, a method of enhancing the possibility of success of decoding by transmitting different data belonging to the same code words at the time of retransmission and enhancing the code redundancy on the receiving-side by the retransmission may be also used. In this case, the code words to which transmitted data belongs are stored in the data-waiting-to-be-deleted management unit 1801 of a transmitting station, and, if retransmission is determined to be performed, the same or a different part of the code words to which the transmitted data belongs is outputted as transmission data.

If success of data decoding of the transmitted data is confirmed, or if the number of retransmissions reaches a predetermined number, the entire code words are deleted from the data-waiting-to-be-deleted management unit 1801.

At the demodulation result addition unit 1702 of a receiving station, output is performed not by overlapping the data received as retransmitted data with received data but by connecting data belonging to the same code words, and decoding of the data is collectively performed by the error correction decoder 1703.

In the second configuration, it is also possible to, by throwing data to be rethrown into a queue with a high priority in a queue configuration like the configuration with the queues 501 to 503, cause the rethrown data to be preferentially selected as a transmission target.

In the second configuration, it is also possible to, by changing the coefficient of the evaluation index based on whether the data is rethrown data or not to make the evaluation index of the rethrown data larger than that of general data in the same queue, cause the rethrown data to be preferentially selected as a transmission target. In this case, it is also possible to, by making a priority difference among rethrown data based on whether the data is quality of service (QoS) assurance data or not, cause the QoS assurance data to be preferentially selected as a transmission target.

In the second configuration, it is also possible to, by considering the communication condition in the past and causing a carrier in a good condition to be preferentially used for rethrown data, preferentially enhance the communication quality of the rethrown data.

Industrial Applicability

This invention is applicable to a multi-carrier wireless communication system. In particular, it is preferably applicable to a mobile communication system.

What is claimed is:

1. A communication control method for a wireless communication system having at least one base station and a plurality of terminals, which allows communication involving retransmission control by use of a plurality of carriers, the method comprising:
 a first step of obtaining, by the base station, a result of decoding data related to a terminal which stores transmitted data;
 a second step of determining, by the base station, based on a number of retransmissions of data transmitted by a first carrier from the base station to the terminal and the data decoding result, whether or not to retransmit the transmitted data by the first carrier;
 a third step of, upon the base station determining to retransmit the transmitted data, scheduling, by the base station, data waiting to be transmitted for carriers other than the first carrier including the data that is determined to be retransmitted; and
 a fourth step of, upon the base station determining not to retransmit the transmitted data, scheduling, by the base station, data waiting to be transmitted for the first carrier and the other carriers.

2. The communication control method according to claim 1, further comprising the step of obtaining a result of determination on a channel condition of each of carriers related to each of the terminals,
 wherein the scheduling is performed by using the channel condition of each of the carriers related to the terminal which stores the data waiting to be transmitted.

3. The communication control method according to claim 2, wherein the result of determination on the channel condition of each of the carriers related to each of the terminals is notified from each of the terminals to the base station.

4. The communication control method according to claim 1, wherein the transmitted data which requires retransmission is scheduled as data waiting to be transmitted.

5. The communication control method according to claim 4, wherein, upon the transmitted data required to be retransmitted being scheduled as data waiting to be transmitted, the transmitted data required to be retransmitted is preferentially selected as a candidate for data to be transmitted.

6. The communication control method according to claim 4, wherein, upon the transmitted data required to be retransmitted being scheduled as data waiting to be transmitted, the transmitted data required to be retransmitted is non-preferentially selected as a candidate for data to be transmitted.

7. The communication control method according to claim 1, wherein the data to be retransmitted is the same part or a different part of the same code words of the transmitted data.

8. A base station, which communicates with a plurality of terminals according to retransmission control by use of a plurality of carriers, comprising:
 a receiver for receiving signals corresponding to the plurality of carriers;
 a control unit for controlling retransmission and scheduling corresponding to the plurality of carriers; and a transmitter for transmitting the signals corresponding to the plurality of carriers for which the retransmission control or the scheduling has been performed, wherein the receiver receives a data decoding result from a terminal which stores transmitted data;

wherein the controlling unit:

determines, based on a number of retransmissions of the transmitted data and the data decoding result, whether or not to retransmit the transmitted data by a first carrier used for transmitting the transmitted data to the terminal;

upon determining to retransmit the transmitted data, schedules data waiting to be transmitted for carriers other than the first carrier including the data that is determined to be retransmitted; and upon determining not to retransmit the transmitted data, schedules data waiting to be transmitted for the first carrier and the other carriers.

9. The base station according to claim 8, wherein:

the controlling unit determines a channel condition of each of carriers related to each of the terminals based on the signals received by the receiver; and the controlling unit performs, in the scheduling of data waiting to be transmitted, the scheduling by use of the channel condition of each of the carriers related to the terminal which stores the data waiting to be transmitted.

10. The base station according to claim 9, wherein the receiver receives, from each of the terminals, a result of the determination on the channel condition of each of the carriers related to each of the terminals.

11. The base station according to claim 8, wherein the controlling unit sets the transmitted data which requires retransmission as a scheduled as data waiting to be transmitted.

12. The base station according to claim 8, wherein, upon the transmitted data required to be retransmitted being scheduled as data waiting to be transmitted, the controlling unit preferentially selects the transmitted data required to be retransmitted as a candidate for data to be transmitted.

13. The base station according to claim 8, wherein, upon the transmitted data required to be retransmitted being scheduled as data waiting to be transmitted, the controlling unit non-preferentially selects the transmitted data required to be retransmitted as a candidate for data to be transmitted.

14. The base station according to claim 8, wherein the data to be retransmitted is the same part or a different part of the same code words of the transmitted data.

* * * * *